US011831539B2

(12) United States Patent
Kaimal

(10) Patent No.: US 11,831,539 B2
(45) Date of Patent: Nov. 28, 2023

(54) METHODS AND SYSTEMS OF SHARING ENCRYPTED ORGANIZATION DATA PACKETS AMONG NETWORK DEVICES BASED ON SERVICE-ORIENTED PROTOCOL

(71) Applicant: Karunesh Rama Kaimal, Fremont, CA (US)

(72) Inventor: Karunesh Rama Kaimal, Fremont, CA (US)

(*) Notice: Subject to any disclaimer, the term of this patent is extended or adjusted under 35 U.S.C. 154(b) by 0 days.

(21) Appl. No.: 17/591,908

(22) Filed: Feb. 3, 2022

(65) Prior Publication Data

US 2023/0246950 A1      Aug. 3, 2023

(51) Int. Cl.
*H04L 45/00* (2022.01)
*H04L 45/021* (2022.01)
*H04L 9/40* (2022.01)

(52) U.S. Cl.
CPC ............ *H04L 45/26* (2013.01); *H04L 45/021* (2013.01); *H04L 63/0435* (2013.01)

(58) Field of Classification Search
None
See application file for complete search history.

(56) References Cited

U.S. PATENT DOCUMENTS

| 7,023,863 | B1 | 4/2006 | Naudus et al. |
| 7,761,702 | B2* | 7/2010 | Weis ............... H04L 63/0428 713/180 |
| 10,033,843 | B2 | 7/2018 | Kumar et al. |
| 11,570,154 | B2* | 1/2023 | Miller .............. H04L 63/0428 |
| 2014/0115320 | A1 | 3/2014 | Ozaki et al. |
| 2022/0103525 | A1* | 3/2022 | Shribman ............ G06F 16/955 |
| 2023/0036806 | A1* | 2/2023 | Moon .................. H04L 9/3247 |

* cited by examiner

*Primary Examiner* — William G Trost, IV
*Assistant Examiner* — Christopher P Cadorna

(57) ABSTRACT

Embodiments of the present disclosure provide systems and methods for sharing encrypted organization data packets among network devices using service-oriented protocol. Method implemented at first network device associated with first autonomous system (AS) includes accessing organization packet (OP) routing information, data structure and service information relating to organization associated with first AS. OP routing information and the service information are being accessed based on organization identifier of the organization and the service information indicating service type associated with the organization. Method includes sending connection request including the data structure and the service information to second network device to establish linked network path. The method includes receiving acknowledgment from the second network device. Responsive to receiving the acknowledgment, the method includes encrypting organization data packet using the data structure and the organization identifier, and sending the encrypted organization data packet to the second network device, via the linked network path.

13 Claims, 10 Drawing Sheets

METHODS AND SYSTEMS OF SHARING ENCRYPTED ORGANIZATION DATA PACKETS AMONG NETWORK DEVICES BASED ON SERVICE-ORIENTED PROTOCOL

TECHNICAL FIELD

The present technology disclosure relates to a network routing protocol and, more particularly to, methods and systems for sharing encrypted organization data packets among network devices associated with the same or different autonomous systems using a service-oriented protocol.

BACKGROUND

With the growth of the Internet, there has been tremendous growth in the number of devices of various kinds connected to the Internet. As a result, the number of routes (i.e., a path across which a data packet travels on a network) is increased. To manage increasing network traffic, routing protocols are deployed that specify how network devices in the network may communicate with each other to distribute routing information. The routing information enables the network devices to select routes for data packet communication.

To keep a profusion of the routes within the network, autonomous systems are deployed within communication networks. An Autonomous System (AS) is a network or group of networks under a single administration having a common routing policy. The autonomous system is administered and maintained by an Internet Service Provider (ISP). For example, customer networks or organization networks, such as universities or corporations, may connect to the ISP, and the ISP may route the network traffic originating from the organization networks to network destinations that may be in the same ISP or may be reachable through other ISPs.

Typically, an autonomous system includes network elements that may be positioned at an edge of the AS and that operate as a point of ingress and egress for network traffic. For example, such network elements may be edge routers or border routers. Further, other network elements may also be included in the AS. In order to communicate network traffic originating at an organization node in the AS, the traffic may have to be routed through one or more autonomous systems. In this regard, the network elements of the one or more autonomous systems may have to exchange or advertise to each other.

Each time a new network element advertises its reachability, also called IP prefix, to its peers, the newly received information is compared against the other network router's stored routing information. When a new route advertisement provides a better path based on various factors (for example, traffic, number of router hops, bandwidth, reliability, and so forth) to reach a certain network, routing information is updated locally and all immediate peers of the new network element are informed. In this way, networks worldwide can reach each other, forming the complex topology of the global internet.

For exchanging reachability advertisement and updated routing information among network elements (usually routers) in different autonomous systems, Border Gateway Protocol (BGP) is used. As it may be understood, a network element that connects to other networks may not know the best path for sending its data packets. Each of the different potential peering options for the network element may communicate routing information it has, to a network element. The network element under consideration may collect routing information from its peers, maintain routing tables, and advertise to its peers. Further, the BGP accesses the routing information and takes into consideration all different peering options that the network element has, to choose the best peering option.

In BGP, certain metrics or attributes for forming peering connections may be exchanged as part of the routing information. Further, the routing advertisement and/or the routing information may be broadcast to different network elements. For broadcasting of the routing advertisement or routing information, the network elements are required to connect in a full mesh network or an AS is broken into smaller areas and a route reflector is used to send the routing advertisement or routing information via a determined active path.

Owing to broadcasting over a full mesh network, highly redundant routing advertisement or routing information may be received at the network elements. Moreover, broadcasting the routing information over the full mesh network may be expensive and cause network congestion. Subsequently, delays may occur at the network elements in the routing and transmission of data packets over the network. In certain cases, delays in routing and transmission of data packets may affect sales conversion rates and impact the quality of service. Moreover, using a route reflector for forwarding routing advertisement by determining active path prevents fast rerouting of data packets and increases convergence time.

Further, a peering connection formed between two network elements based on broadcasted routing information in a TCP session is not secure. The peering connection between network elements may be prone to a number of security threats such as, for example, route manipulation, route hijacking, denial of service, and the like. In case of any inadvertent or malicious misconfiguration of a network element, for example, if a network element advertises itself as the best path to an unrelated network, the network may be severely impacted rendering the Internet vulnerable and unstable. Furthermore, an update in the routing information or a routing advertisement may take a longer duration to propagate within an AS based on BGP attributes. Further, the security requirements of the organization network may not be accounted for in the peering connection, and thus the determined active path. Therefore, determining an active path between network elements for forwarding the routing information in highly available network architecture is also subjected to delays and security threats.

In certain cases, some BGP attributes corresponding to a peering connection between two network elements in an active communication path may not be acceptable to a source network element, i.e., such BGP attributes may not be compliant with a source organization network's defined policy. However, in such cases, data packets are transmitted over peering connections irrespective of the organization network's policies. This may render the organization's data packets prone to security threats due to vulnerabilities of the BGP. This may further affect the integrity and confidentiality of the organization's data. The organization networks in the AS may have to purchase and install additional security products, such as firewall, VPN, encryption products, and so forth, for communicating over the Internet. This may increase the cost associated with networking over the Internet and delays in the communication of data packets.

Furthermore, the BGP may not take into consideration any malfunctioning or inconsistencies of the network elements. As a result, a user may be unable to access data until the network element is restored, thereby causing delay and user frustration. In addition, there may be packet loss due to network congestion, malfunctioning network elements, and ineffective peering connection between the network elements. Due to packet loss, the quality of a file, such as a video conference, video streaming, and real-time document collaboration, may be severely negatively impacted.

There is a need to overcome the drawbacks of the conventional routing protocol and enable organizations to route data packets in a secure and seamless manner.

SUMMARY

Various embodiments of the present disclosure provide methods and systems and non-transitory machine-readable storage media for establishing a communication link for routing organization data packets using a service-oriented protocol.

In an embodiment, a computer-implemented method is disclosed. The method is implemented by a first network device of a first autonomous system (AS). The method includes accessing organization packet (OP) routing information, a cryptographic key data structure, and service information relating to an organization associated with the first AS. The OP routing information and the service information being accessed based at least on an organization identifier of the organization. The service information indicates a service type associated with the organization. The method includes sending a connection request to a second network device associated with a second autonomous system to establish a linked network path between the first network device and the second network device. The connection request comprises the cryptographic key data structure and the service information. The first network device and the second network device are configured with organization transit gateway protocol (OTGP). The method includes receiving an acknowledgment pertaining to the linked network path from the second network device, wherein the second network device completes the linked network path based on the cryptographic key data structure. The method further includes encrypting the organization data packet using the cryptographic key data structure and the organization identifier in response to receiving the acknowledgment. The organization data packet has an associated OP header. The method includes sending the encrypted organization data packet to the second network device, via the linked network path.

In another embodiment, a device is disclosed. The device includes a memory, an interface, and a processor communicably coupled to the memory and the interface. The memory stores instructions that configure the processor to perform operations. The processor is configured to access organization packet (OP) routing information, a cryptographic key data structure, and service information relating to an organization associated with a first autonomous system. The OP routing information and the service information are accessed based at least on an organization identifier of the organization. The service information indicates a service type associated with the organization and the first autonomous system is associated with the device. The processor is configured to send a connection request to a network device associated with a second autonomous system to establish a linked network path between the device and the network device. The connection request comprises the cryptographic key data structure and the service information. The device and the network device are configured with organization transit gateway protocol (OTGP). The processor is configured to receive an acknowledgment pertaining to the linked network path from the network device. The network device is to complete the linked network path based on the cryptographic key data structure and send the acknowledgment. The acknowledgment comprises a security key. The processor is further configured to encrypt an organization data packet based, at least in part, on the security key and the organization identifier, responsive to receiving the acknowledgment. The processor is configured to send the encrypted organization data packet to the network device, via the linked network path.

In yet another embodiment, a non-transitory machine-readable storage medium is disclosed. The non-transitory machine-readable storage medium provides instructions that, if executed by a processor of a first network device acting as an organization transit gateway protocol (OTGP) router associated with a first autonomous system, cause the processor to perform operations including accessing organization packet (OP) routing information, a cryptographic key data structure and service information relating to an organization associated with a first autonomous system. The OP routing information and the service information are accessed based at least on an organization identifier of the organization. The service information indicates a service type associated with the organization. The processor is further caused to perform an operation including sending a connection request to a second network device to establish a linked network path with a second network device. The connection request comprises the cryptographic key data structure and the service information, wherein the first network device and the second network device are configured with organization transit gateway protocol (OTGP). The processor is further caused to perform an operation including receiving an acknowledgment pertaining to the linked network path from the second network device, wherein the second network device completes the linked network path based on the cryptographic key data structure. Responsive to receiving the acknowledgment, the processor is further caused to perform an operation including encrypting an organization data packet using the cryptographic key data structure and the organization identifier. The organization data packet has an associated OP header indicating the OP routing information. The processor is further caused to perform an operation including sending the encrypted organization data packet to the second network device, via the linked network path.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

DETAILED DESCRIPTION

Figure 1:
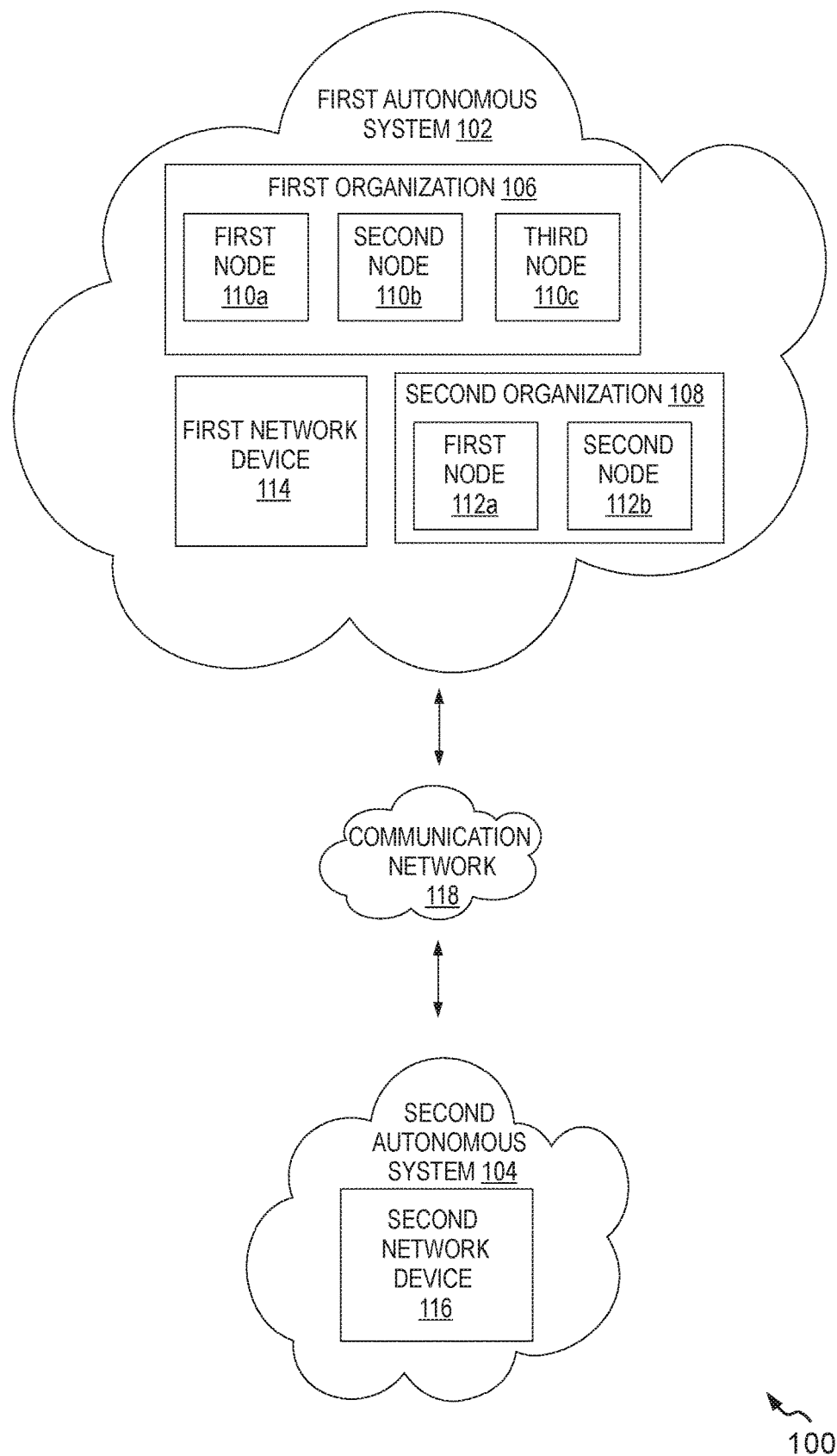
FIG. 1 illustrates an exemplary representation of an environment related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "Internet Service Provider (ISP)", used throughout the description refers to an organization that may enable web access and other services, such as email service, domain registration, web hosting, and browser services, to organizations and individual consumers. The users of ISP offerings are referred to herein as 'customers' of the ISP. In many scenarios, customers of an ISP may be an organization or users associated with an organization. In such case, customers may register with the ISP to avail services relating to accessing, using, or participating on the Internet. For example, the ISP may be a tier 2 or a tier 3 ISP. An ISP may include multiple autonomous systems.

The term "autonomous system (AS)", used throughout the description refers to a set of Internet routable IP prefixes belonging to a network that may be managed, controlled, and supervised by an administrative entity. The administrative entity of the autonomous system may be the ISP. The AS may control a collection of connected routing prefixes that represent different IP addresses, based on a common routing policy of the ISP. For example, an autonomous system may be assigned an autonomous system number (ASN) for routing of data packets to, from, and/or through the autonomous system. An AS may be a communications network including routing nodes for routing data packet flows to the correct destination address. The AS may be an Internet Service Provider, an organization, or an entire corporate network, including multiple locations (IP addresses).

The term "BGP" or "border routing protocol", used throughout the description, refers to standardized exterior gateway protocol designed to exchange routing and reachability information between autonomous systems (AS) on the Internet. BGP may enable the connection between any networks of autonomous systems using an arbitrary topology. In particular, BGP requires that each AS have at least one network device (such as, a router) that is able to run BGP and that the network device connects to at least one other BGP network device across any of the autonomous systems. The main function of the BGP is to exchange network reachability information, i.e., routing information, with other BGP systems for peering between two network devices.

The term "network device", used throughout the description, refers to networking hardware or an electronic device that may be required for communication and interaction between devices on a computer network. The network device may be a router, specifically, an Organization Transit Gateway Protocol (OTGP) router that connects an AS to other autonomous systems maintained and controlled by the same ISP or different ISP. Specifically, the network device may mediate data transmission on a computer network.

Overview

Typically, network device vendors or organizations purchase a security appliance or hardware for connectivity. For example, a single organization may be operating from two different sites. In such a case, the organization may have to purchase two security appliances for the two sites of the organization. In an example, the security appliance may be a firewall. Further, to ensure high redundancy, two pair of security appliances may have to be deployed on each site of the organization. Deployment of such large numbers of security appliances may be expensive. Continuing further, through these security appliances, the organization initiates to establish a linked network path, such as the Internet Protocol Security (IPSec) tunnel. In phase 1 of establishing an IPSec tunnel, a secure channel may be established between two participating electronic devices, from the two different sites, to negotiate IPSec security association (SA) parameters. In phase 2 of establishing the IPSec tunnel, the two electronic devices negotiate the IPSec SA for authenticating data traffic that will flow through the tunnel. Moreover, a service of encryption of data packets to be communicated between the sites of the organization is managed by the security appliance.

Owing to this set-up of security appliances in the organization, BGP is only used to connect two sites of an organization serviced by corresponding Internet Service Providers (ISPs). However, BGP does not provide any data security function or any service, such as encryption. Therefore, overheads may be added on each data packet (or IP packet) originating from the organization's security appliance which results in low data rate transfer with no real-time applications usage. The IPsec encapsulation or encryption overhead, along with the IP and frame overhead, may cause a resulting ESP data packet to exceed the maximum transmission unit (MTU) of the physical interface, which causes fragmentation. Fragmentation results in increased use of bandwidth and device resources.

To overcome the above limitations, various embodiments of the present disclosure provide a method, a system, and a non-transitory machine-readable storage medium for sharing encrypted organization data packets among network devices based on service-oriented protocol.

In an embodiment, a communication system is disclosed. The communication system includes a first autonomous system (AS) and a second autonomous system. Each of the first AS and the second AS may include one or more edge or border networking devices. For sake of clarity and illustrative purposes only, an AS is described to have a single edge network device. Pursuant to the present example, the first AS includes a first network device. The first network device is an edge network device of the first AS. Similarly, the second AS includes a second network device, the second network device being the edge network device of the second AS.

The first network device is configured to access organization packet (OP) routing information, a cryptographic key data structure, and service information relating to the organization. The OP routing information and the service information being are based at least on an organization identifier of the organization. The service information indicates a service type associated with the organization. The first network device may be an Organization Transit Gateway Protocol (OTGP) router that connects the first AS to other autonomous systems maintained and controlled by the same ISP or different ISP. In particular, the first network device may be an OTGP speaker during a first time period, during which the first network device may exchange routing and reachability information with its peering routers to form a communication link.

The first autonomous system may be a network that is controlled by an ISP, based on a common routing policy. For example, an organization may run within the first AS using public or private ASN to the corresponding ISP. The first AS connects an organization network to the Internet, via the ISP. The ISP may provide web services to the organization, specifically, computing nodes associated with the organization, using the first AS. The manner in which the first network device, i.e., the OTGP router operates is described in detail throughout the present disclosure.

The first network device is configured to send a connection request to the second network device to establish a linked network path between the first network device and the second network device. The connection request includes the cryptographic key data structure. In an example, establishing the linked network path includes configuring the first network device and the second network device with the service type. The first network device and the second network device are configured with organization transit gateway protocol (OTGP). The first network device is configured to receive an acknowledgment pertaining to the linked network path from the second network device. The second network device is to complete the linked network path based on the cryptographic key data structure. Further, responsive to receiving the acknowledgment, the first network device is configured to encrypt an organization data packet using the cryptographic key data structure and the organization identifier. The first network device is configured to send the encrypted organization data packet to the second network device, via the linked network path.

The present disclosure provides a service-oriented Internet routing protocol referred to as 'Organization Transit Gateway Protocol' or 'OTGP'. The routing protocol defined in the present disclosure is meant to carry internet traffic or data packets from different organizations, businesses, data centers, or clouds to enable the customers to avail web services, based on policy or requirements of the customers.

The present disclosure describes an Organization Transit Gateway Protocol (OTGP) that is developed based on Reach, Attempt, Interconnect, and Network (RAIN) architecture. In particular, different service messages are shared iteratively with a peer router during each of the RAIN stages to form a neighbor relationship link with the peer router. Further, routing information is communicated to the second network device during the Network stage in a secure manner.

Various embodiments of the present disclosure offer multiple advantages and technical effects. For instance, the routing information is not broadcasted to the second network device for forming a peering connection over a TCP session. Instead, as per the present disclosure, a linked network path is established between the first network device and the second network device. The linked network path is the active path in a high availability architecture. By sharing the routing information over the linked network path, a neighbor relationship link is formed between the first network device and the second network device. It is to be noted that the linked network path is established by matching service information required by the organization or customer with the path attributes of the linked network path. The linked network path is compliant with the requirements of the organization. As the linked network path is active, delays in communication due to unavailability or non-reachability of the second network device are substantially reduced.

The linked network path is established dynamically by the first network device and the second network device, using the cryptographic key data structure that may further enhance the reliability of the linked network path. Moreover, in cases of unavailability of the second network device, the linked network path may not be formed, thereby preventing delays due to non-operational network paths. Further, the organization data packets are encrypted based on organization identifier and sent to the second network device over the secure linked network path. In this manner, complete security of organization data packets is ensured. Moreover, routing or communication of organization data packets is performed based on the organization's policies. As the organization packets are encrypted based on organization identifiers, the linked network path between the first network device and the second network device may be used for communication of organization data packets from different organizations at the same time. Further, as security, encryption, and policing requirements of the organization data packets are performed by the first network device, i.e., OTGP router, additional networking products may not be required for communication of organization data packets. As a result, the costs incurred for secure networking by the organization may decrease substantially. Moreover, delays due to incoherent operation of different networking products may also be substantially reduced.

In accordance with an embodiment of the present disclosure, the organization may have a simple ISP line connected to the first network device, i.e., an edge OTGP network device. The organization may also be connected to data forwarders, i.e., forwarding OTGP network devices. The OTGP network devices form neighbors and are configured to establish the linked network path based on the service type. In an example, a service required by the organization may be a secured service (VPN), for example, IPSec-based service configuration. In such a case, the first and the second network devices form neighbors by completing phase 1 of the IPsec tunnel, i.e., forming a linked network path, dynamically. In this regard, for the phase 1 of establishing the IPSec tunnel between the first and the second network device is handled by the OTGP, thereby covering the overheads. Further, unique keys, such as organization identifier and security key, are used by the computing nodes in the organization in phase 2 to encrypt organization network traffic and send it across the linked network path formed by the network devices. Specifically, the actual data transfer that takes place in phase 2 is handled by the organization, i.e., the computing nodes in the organization encrypt the data packets using a unique encryption key for the transfer of the data packets. Such a unique encryption key may be decided by the organization. In addition, as a security function is provided by the OTGP, i.e., the gateway protocol, additional security appliances are not required. Subsequently, the service-oriented OTGP protocol has no overheads of ESP data packets owing to the highly redundant infrastructure of additional security appliances in the organization. Moreover, the network communication system facilitated by the OTGP is fault-tolerant. In other words, when anything fails, the OTGP will switch to other paths automatically without service disruption. In addition, the organization may not need any security appliance or any other equipment. Network infrastructure formed based on the OTGP is more economical as no expenditure is required on expensive security appliances with its yearly license renewal requirement. The OTGP network infrastructure described in the present disclosure may be extended to ordinary service providers and for small/home business entities. In one example, everyone has internet connectivity at home/office/shops to large corporations. But small entities or individuals don't have the option to get enterprise-level services without spending a significant amount purchasing security appliances that the OTGP routing protocol provides. Various embodiments of the present disclosure are described hereinafter with reference to FIG. 1 to FIG. 9.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, establishing a linked network path using an organization transit gateway protocol (OTGP). The environment 100 generally includes a plurality of autonomous systems (for example, a first autonomous system (AS) 102 and a second autonomous system (AS) 104). The term 'autonomous system' as used throughout the description may refer to a network having a unified routing policy that may be managed by an administrative entity, such as an associated ISP, a large enterprise technology company, a university, or a government agency. In particular, a computing node may connect to the AS to access the Internet and avail the services offered by the ISP.

The Autonomous System (AS) is defined as a logical portion of a larger IP network. An AS normally includes internetwork within an organization. It is administered by a single management authority. An AS can connect to another AS managed by the same administrative entity. It can also connect to other public or private networks.

The environment 100 operates in the context of a data communication network including multiple network elements. Some of the network elements in a network may be network devices such as routers, switches, gateways, or servers. The network device may include, for example, a processor, memory, interfaces, and a bus. While a certain number of entities are depicted in the environment 100 for purposes of illustration, other environments may include any number or arrangement of nodes. The depiction of the environment 100 as described below herein is only illustrative and should not be construed as limiting in any manner.

In an example, a first organization 106 and a second organization 108 are enrolled under the first AS 102. In particular, the first organization 106 may include a first set of nodes, depicted as nodes 110a, 110b, and 110c, and the second organization 108 may include a second set of nodes, depicted as nodes 112a and 112b. Herein, the nodes 110a-110c and nodes 112a and 112b may be computing entities, such as computing devices or network devices that may be capable of sending data packets, receiving data packets, processing data packets, and/or routing data packets. In another example, the nodes 110a-110c, 112a, and 112b may be computing devices that may be used for accessing the Internet and avail various services, such as email, video conference, video stream, gaming, and so forth, by users within organizations 106 and 108, respectively. For example, each of the nodes 110a-110c, 112a, and 112b may have a corresponding unique IP address for its identification on the Internet. As may be understood, each of the nodes 110a-110c, 112a, and 112b may also have a corresponding unique device identifier, for example, MAC address, for its identification.

In accordance with embodiments of the present disclosure, the autonomous systems, i.e., the first AS 102 and the second AS 104 further include a first network device 114 and a second network device 116, respectively. The network device is used interchangeably with the OTGP router in the description; however, it should not be interpreted as a limitation.

Other examples of the network device may include, but are not limited to, gateways, switches, bridges, hubs, and so forth. The first network device 114 and the second network device 116 may be implemented using any type of a computer, such as a special-purpose computer, router, switch, or general-purpose computer, and may use hardware logic such as in an application-specific integrated circuit (ASIC), field-programmable gate array (FPGA), system-on-a-chip (SoC) or other combinations of hardware, firmware and/or software. In an embodiment, the first network device 114 is configured to exchange network reachability information with other devices connected to a communication network 118. The reachability information is used to store data values in memory that represent a graph of connectivity between one or more autonomous systems within the environment 100 and connectivity between the autonomous systems and devices.

In one example, the first network device 114 and the second network device 116 may each administer organization transit gateway protocol (OTGP). Each of the network devices 114 and 116 may establish a neighbor relationship link with other network devices in the same area or different areas of the network. Each of the network devices 114 and 116 may receive route update information from its neighbors. In an example, route update information may be received through a flooding process. Each of the network devices 114 and 116 may maintain a routing table, for example, for storing its routing information obtained from its neighbors. The operation of OTGP routers 114 and 116 is described in detail with respect to the following figures.

The first AS 102 and the second AS 104 may be interconnected by corresponding OTGP routers 114 and 116, via the communication network 118. For example, the communication network 118 may be embodied as a wired network, a wireless network, or a combination of wired and wireless networks. Some non-limiting examples of the wired network include Ethernet, Local Area Network (LAN), Optical Fibre network or combinations, thereof. Some non-limiting examples of the wireless network include a cellular network, a wireless LAN (WLAN) network, a Bluetooth or a ZigBee network, and combinations thereof. An example of a combination of a wired network and a wireless network is the Internet. Various entities in the environment 100, such as the OTGP routers 114 and 116, may connect to the communication network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, and the like.

In an example, routing decisions within each of the first AS 102, and the second AS 104 may rely on an interior gateway protocol (IGP), such as Open Shortest Path First (OSPF) or Intermediate System-to-Intermediate System (ISIS). Further, for routing data packets outside the respective AS, for example, from first AS 102 to second AS 104, OTGP routing information may have to be exchanged among the autonomous systems 102 and 104, using an exterior gateway protocol, such as organization transit gateway protocol (OTGP). For example, the first network device 114 in the first AS 102 may exchange routing information with the second network device 116 in the second AS 104 using a plurality of service messages.

In an example, communication between the first network device 114 and the second network device 116 may be affected by exchanging discrete organization data packets or messages in accordance with protocols, such as Transmission Control Protocol/Internet Protocol (TCP/IP). It may be noted that the representation of only two autonomous systems 102 and 104 is only illustrative and any number of autonomous systems may be included in the environment 100. Moreover, any number of OTGP routers 114 and 116 may be present in a single autonomous system and an OTGP router may be connected to any number of OTGP routers from other autonomous systems. It will be understood by those skilled in the art that the organization transit gateway protocol (OTGP) as discussed herein is described to be used in conjunction with TCP/IP protocol for communication. The OTGP provides unique features for organizations to route all types of traffic mainly IPv4, IPv6, or Ethernet frames. The OTGP enables customers/organizations to implement some sort of policy on their vendor ISP infrastructure.

However, this should not be construed as a limitation and in other examples of the present disclosure, and the OTGP may be implemented in conjunction with File Transfer Protocol (FTP), User Datagram Protocol (UDP), HyperText Transfer Protocol (HTTP), Internet Message Access Protocol (IMAP), Simple Mail Transfer Protocol (SMTP), Interior gateway protocol (IGP), Border gateway protocol (BGP), and so forth, without departing from the scope of the disclosure.

In operation, a session within the environment 100 may involve the first network device 114 and the second network device 116 for establishing a communication line for data packet routing and transfer. For example, each of the first network device 114 and the second network device 116 executes one or more routing protocol processes and performs the function of the border or edge router of the first AS 102 and the second AS 104, respectively. The first network device 114 may exchange routing information with the second network device 116. Based on the routing information, a linked network path may be established between the first network device 114 and the second network device 116. The organization data packets generated at the organization 106 by any of the nodes 110a, 110b, or 110c may then be routed to the second network device 116 for communication to a corresponding destination, using the linked network path.

In an example, the first network device 114 may access organization packet (OP) routing information, a cryptographic key data structure, and service information relating to the first organization 106 associated with the first AS 102. The OP routing information and the service information are being accessed based at least on an organization identifier of the first organization 106. Further, the service information may indicate a service type associated with the first organization 106. In an example, the OP routing information may include a plurality of route tables. The route tables may include objects that may establish a binding between protocol addresses and link-layer addresses for routers sharing the same physical link with the first network device 114. The route tables may allow the first network device 114 to look at router bindings and their properties, and further establish a communication link with the bonded routers. For example, the route tables may be updated to add a new neighbor router or delete old and/or dysfunctional routers. The route tables may be stored within a memory element of the first network device 114 or maybe stored remotely from the first network device 114 and the first AS 102.

Pursuant to the present disclosure, the first network device 114 may form a neighbor relationship link with the second network device 116 by sending a plurality of service messages. The plurality of service messages may correspond to Reach, Attempt, Interconnect, and Network (RAIN) architecture. The first network device 114 may establish a neighbor relationship link with a neighbor router, such as the second network device 116 by sharing several service messages based on the RAIN architecture. Thereafter, the first network device 114 may establish a linked network path, such as an Internet Protocol Security (IPsec) tunnel with the second network device 116 to route organization data packets generated by the first organization 106 within the first AS 102, for example, from the first organization 106 or the second organization 108 to the second AS 104. It may be noted that the linked network path based on IPSec configuration is only for exemplary purposes. In other examples of the present disclosure, the linked network path may be based on generic routing encapsulation (GRE) configuration, IPIP configuration, virtual extensible LAN (VXLAN), dynamic multipoint VPN (DMVPN), or any other open standards for the communication channel.

For example, the linked network path and the communication link between the first network device 114 and the second network device 116 are formed based on service information defined by the first organization 106. The service information relating to the first organization 106 may indicate requirements or policies of the first organization 106, for example, that may be defined by an administrator of the first organization 106. The service information for the first organization 106 may be accessed based on an organization identifier associated with the first organization 106. In this manner, routing of data packets from the first organization 106 to the second AS 104, via the first AS 102, may be regulated based on service information defined for the first organization 106. Subsequently, additional features (such as network security functionality and policing functionality) may be provided by the ISPs in integration with the routing functionality. As a result, small entities or individuals may avail enterprise-level network security services without spending a significant amount on the purchase of network security appliances, such as firewalls, Fortinet, and so forth. The manner in which the OTGP operates is described in further detail with respect to the appended figures below.

Figure 2:
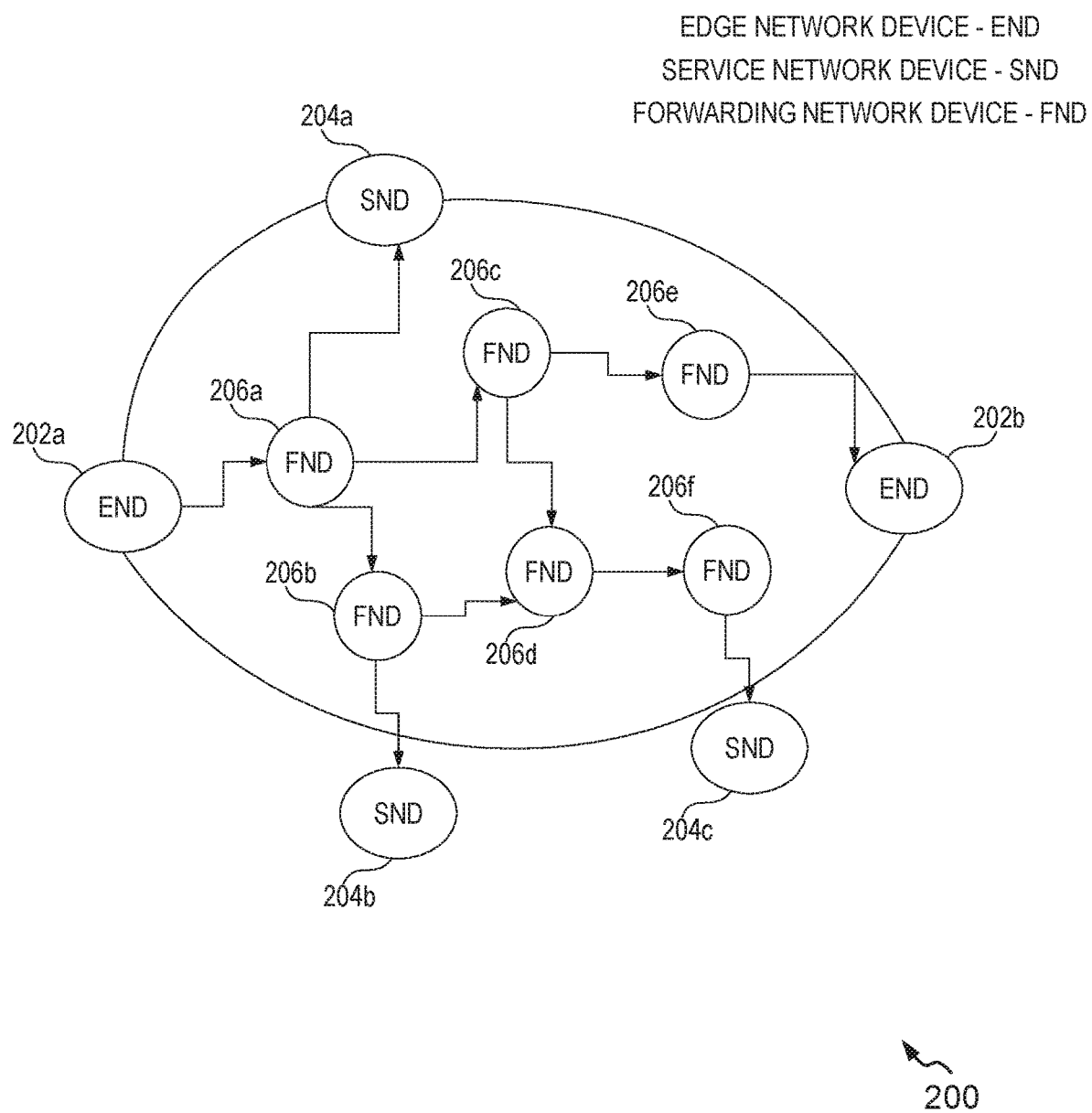
FIG. 2 illustrates an exemplary representation of an autonomous system environment related to at least some example embodiments of the present disclosure.

FIG. 2 illustrates an exemplary representation of an autonomous system environment 200 related to at least some example embodiments of the present disclosure. For sake of clarity, in an example, the autonomous system environment 200 may relate to the first AS 102. The AS environment 200, i.e., the first AS 102, may include a plurality of network devices, depicted as network devices 202a, 202b, 204a, 204b, 204c, 206a, 206b, 206c, 206d, 206e, and 206f. The plurality of network devices includes edge network devices 202a and 202b, i.e., edge OTGP routers 202a and 202b. The plurality of network devices further includes service network devices 204a-204c, i.e., service OTGP routers 204a-204c, and forwarding network devices 206a-206f, i.e., forwarding OTGP routers 206a-206f. It may be noted that the AS environment 200 may also include computing nodes (not shown in FIG. 2), such as the first set of nodes 110a, 110b, and 110c associated with the first organization 106, and a second set of nodes 112a and 112b associated with the second organization 108.

The edge OTGP routers 202a and 202b may correspond to the first network device 114. In other words, the operations and functions associated with the first network device 114 (as depicted in FIG. 1) may be performed by either one or both of the edge OTGP routers 202a and 202b. The edge OTGP routers 202a and 202b may be configured to establish connections between organizations and/or autonomous systems.

In operation, the edge OTGP routers 202a and 202b may determine a service type and an IP type associated with a corresponding organization, for example, a service type of the first organization 106 and IP type for routing of data packets from the first organization 106. Moreover, the edge OTGP routers 202a and 202b may be configured to maintain and update OP routing information associated with a communication network 118 and relating to the first AS 102 or the AS environment 200. The OP routing information may only be updated by the edge OTGP routers 202a and 202b. Subsequently, the edge OTGP routers 202a and 202b are operable to update or change a revision identifier associated with the OP routing information. A value of the revision identifier of the OP routing information indicates a version of the OP routing information. Further, the edge OTGP routers 202a and 202b are also operable to update vendor hops (VHOP) values of data packets crossing through the edge OTGP routers 202a and 202b. As may be understood, the VHOP value may indicate the number of router hops undergone by a data packet to reach a corresponding destination. Therefore, the VHOP value of a data packet is increased only when it passes from one Internet service provider (ISP) or vendor associated with ISP to another. For example, if there are two Internet service providers between a source organization and a destination organization, a VHOP value of a data packet received at the destination will be 2, irrespective of the hop count of the data packet.

Further, the edge OTGP routers 202a and 202b may perform route advertisements to exchange updates and changes in the network with their peers or neighbors. For example, the edge OTGP routers 202a and 202b may maintain network information via route tables as OP routing information. The route tables may include information such as routes, router names, interface names, IP addresses, nodes, and network addresses, based on configured protocol. Using the OTGP routing protocol, the edge OTGP routers 202a and 202b are operable to establish an OTGP session to send a plurality of service messages to another network device, for example, a second edge router of a second AS. The plurality of service messages may comply with RAIN architecture. In this regard, a first service message may be sent on a pre-configured communication port to perform 'REACH' operation (i.e., discover the second edge router); a second service message may be sent to perform 'ATTEMPT' operation (i.e., negotiate a set of routing parameters with the second edge router); a third service message may be sent to perform 'INTERCONNECT' operation (i.e., ensure that neighbor relationship link is formed with the second edge router and has full reachability); and a fourth service message may be sent to perform 'NETWORK' operation (i.e., send the OP routing information, route advertisement, or organization data packet with the second edge router). The plurality of service messages may include a packet header comprising a set of fields. The set of fields are provided as follows:

(a) Operation field: It includes data required to satisfy the conditions described by the value of the Type field in the packet header. In other words, the operation field in the packet header of the service message may carry data pertaining to actions associated with the service message, i.e., the action to be performed based on the transmission of the service message to the second network device 116.

(b) Error field: It represents an error message.

(c) Type field: The 'type field' indicates the operation type of an operation of the service message. The operation may be one of: 'REACH', 'ATTEMPT', 'INTERCONNECT', and 'NETWORK'.

(d) Length field: It represents the total length of the service message and the packet header.

(e) Version field: It represents a version identifier of the running OTGP routing protocol.

(f) Time To Live (TTL) field: It indicates the number of routers or network devices that the service message has passed through.

In this manner, the OP routing information is exchanged on a secured communication link without broadcasting, thereby preventing any interception of the OP routing information and maintaining the integrity of such OP routing information. Moreover, based on a version of the OP routing information, the edge OTGP routers 202a and 202b may update a revision identifier associated with the OP routing information. Based on the route advertisement, the second edge router may update its corresponding OP routing information.

The service OTGP routers 204a-204c may partially perform operations associated with the edge OTGP routers 202a and 202b. In particular, the service OTGP routers 204a-204c may not participate in route advertisement. The service OTGP routers 204a-204c may be used on the customer or hosting side of the Internet service provider, i.e., the organization side. For example, the first organization 106, which is a customer of an internet service provider associated with the first AS 102, may be a video communications company. Further, the first organization 106 may use the service OTGP routers 204a-204c as edge routers for the first organization 106 and declare or provide service information associated with the first organization 106 to the service OTGP routers 204a-204c. The edge OTGP routers 202a and 202b may access such service information from the service OTGP routers 204a-204c and distribute or advertise route information based on the accessed service information, to other edge routers, via peering connection or having a dedicated server.

In one embodiment, the forwarding OTGP routers 206a-206f may be configured to forward network data traffic across various network elements within the AS environment 200. In particular, the forwarding OTGP routers 206a-206f may not be involved in the routing of data packets or route advertisement. The forwarding OTGP routers 206a-206f may use internal gateway protocols, for example, Open Shortest Path First (OSPF), Routing Information Protocol (RIP), Intermediate System to Intermediate System (IS-IS), and Enhanced Interior Gateway Routing Protocol (EIGRP) to forward network data traffic within the AS environment 200. In an example, the forwarding OTGP routers 206a-206f may forward network data traffic from one edge OTGP router, such as the edge OTGP router 202a, to another edge OTGP router, such as the edge OTGP router 202b. In another example, the forwarding OTGP routers 206a-206f may forward network data traffic from one edge OTGP router, such as the edge OTGP router 202a, to a service OTGP router, such as the service OTGP router 204b. The examples of forwarding are only illustrative and should not be construed as limiting. The forwarding OTGP routers 206a-206f may also provide security if any of the internal routers is compromised.

The AS environment 200 described in the present example is only illustrative and should not be construed as limiting in any way. In other examples of the present disclosure, any number and combination of edge network devices, service network devices, and forwarding network devices may be present within the AS environments. Further, in certain cases, the service network devices and/or the forwarding network devices may not be present in an AS environment.

Figure 3:
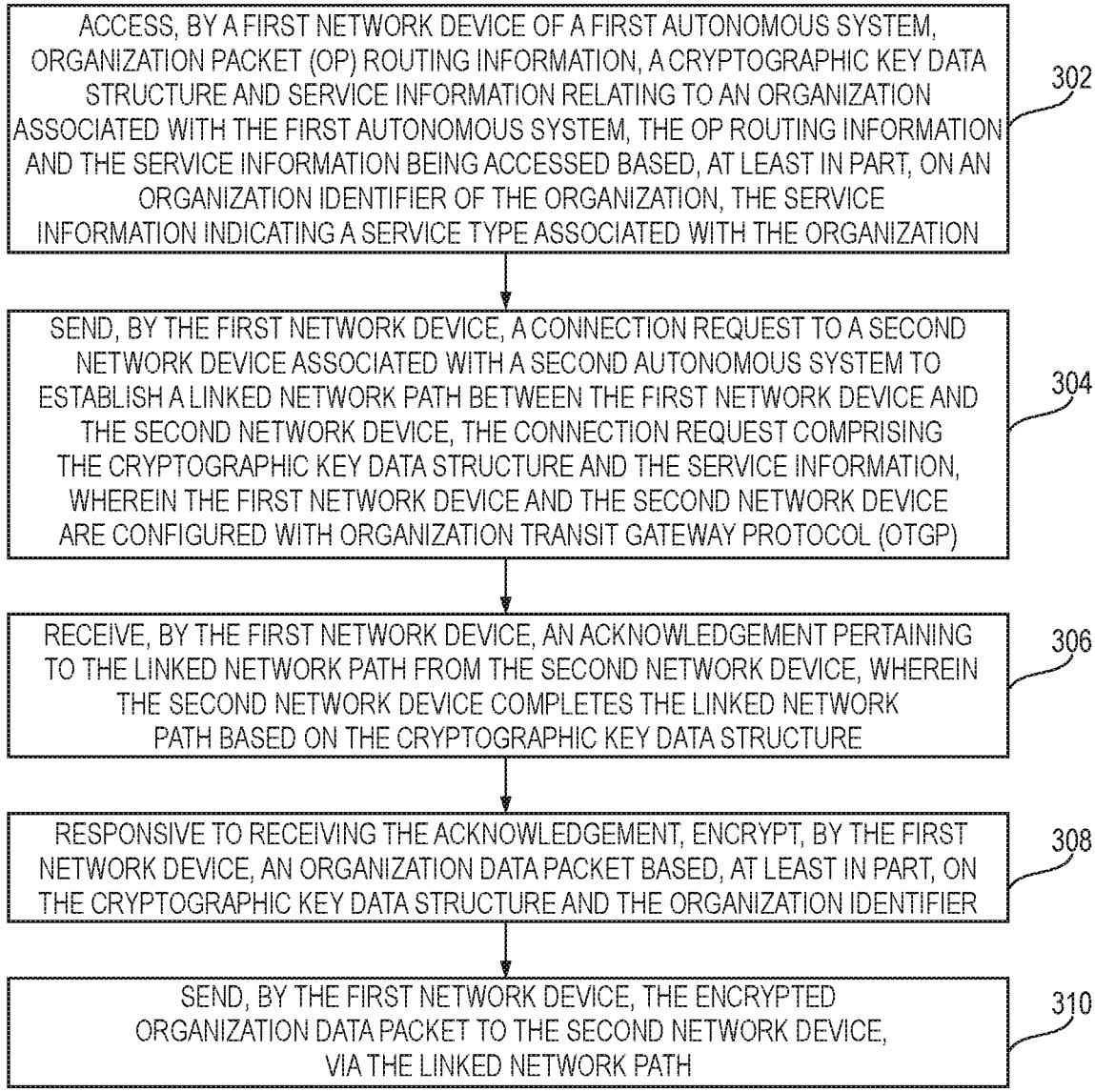
FIG. 3 is a flow diagram of a computer-implemented method of sharing encrypted organization data packets among network devices based on service-oriented protocol, in accordance with an embodiment of the present disclosure.

FIG. 3 is a flow diagram of a computer-implemented method 300 for forming neighbor communication links for routing network traffic, in accordance with an embodiment of the present disclosure. The method 300 depicted in the flow diagram may be executed by, for example, a processor of the first network device 114. Operations of the flow diagram of the method 300, and combinations of operation in the flow diagram of the method 300, may be implemented by, for example, hardware, firmware, a processor, circuitry, and/or a different device associated with the execution of software that includes one or more computer program instructions. It is noted that the operations of the method 300 can be described and/or practiced by using a system other than these server systems. The method 300 starts at operation 302.

At the operation 302, the method 300 includes accessing, by the first network device 114, organization packet (OP) routing information, a cryptographic key data structure, and service information relating to the first organization 106 associated with the first autonomous system 102. The OP routing information may include information pertaining to neighbors of the first network device 114. The neighbors may be connected with the first network device 114 by the same physical link; and various nodes or routers, services, and connections within the communication network. In an example, OP routing information may include information, such as MAC address of neighbors, properties of neighbors, IP address of neighbors, communication port of the neighbors, and so forth. For example, the OP routing information may include an Organization Packet (OP) route table, OP service table, and OP link table. The cryptographic key data structure may be a pre-defined hash table having data stored in an array format and that may map keys to values. Each data value within the hash table may have an associated index value or hash code that is computed using a hash function. Furthermore, the service information relating to the organization may indicate service requirements or service plans selected by a customer, such as the first organization 106. The service information may indicate, for example, properties or attributes of communication, based on which organization data packets generated by the first organization 106 may be communicated to its destination network device.

The first network device 114 may access the OP routing information and the service information accessed, based at least on an organization identifier of the first organization 106. In an example, the first network device 114 may access the OP routing information from an associated memory. Such OP routing information may be gathered from neighbors that advertised to the first network device 114. Further, the first network device 114 may collect the service information based on an organization identifier. The service information may indicate a service type selected by the first organization 106. The organization identifier may be a unique identifier allocated to the first organization 106 when the first organization 106 may register with an ISP associated with the first AS 102. Subsequently, a network administrator of the organization 106 may define the service information, for example, at the time of registering, or later. For example, such service information may be stored in conjunction with the organization identifier, within a database associated with the ISP. To this end, on identifying nodes, such as nodes 110a-110c, associated with the first organization 106 within the first AS 102, the first network device 114 may retrieve its organization identifier and further access the service information corresponding to the first organization 106. It may be noted that organization identifier may be the same for different nodes 110a-110c within the first organization 106.

At operation 304, the method 300 includes sending, by the first network device 114, a connection request to a second network device 116 associated with a second autonomous system 104 to establish a linked network path between the first network device 114 and the second network device 116. The connection request includes the cryptographic key data structure and the service information. The first network device 114 and the second network device 116 are configured with organization transit gateway protocol (OTGP). For example, the cryptographic key data structure is shared with the second network device 116. The second network device 116 completes the linked network path between the first network device 114 and the second network device 116. In an example, the second network device 116 may complete the linked network path dynamically, upon receiving the connection request. For example, prior to sending the connection request, the first network device 114 may exchange the OP routing information and the service information with the second network device 116 by using a RAIN architecture. In this regard, the first network device 114 may form a neighbor relationship link with the second network device 116 by sending a plurality of service messages. The neighbor relationship link is formed based on the service information or service type selected for the first organization 106. Once the neighbor relationship link is formed, the OP routing information is exchanged or advertised in a secured manner.

At operation 306, the method 300 includes receiving, by the first network device 114, an acknowledgment pertaining to the linked network path from the second network device 116. The second network device 116 completes the linked network path based on the pre-defined data structure. By sharing the acknowledgment, the second network device 116 makes known to the first network device 114 that the linked network path is established. For example, the linked network path formed based on the cryptographic key data structure may provide an encrypted and secure connection between the first network device 114 and the second network device 116 over a shared network infrastructure, such as the public Internet. In an example, the linked network path may correspond to phase 1 of the Internet Protocol Security (IPsec) tunnel for a virtual private network (VPN), a GRE tunnel, an IPIP tunnel, a VXLAN tunnel, a DMVPN tunnel, and the like.

At operation 308, the method 300 includes encrypting, by the first network device 114, an organization data packet based on the cryptographic key data structure and the organization identifier, responsive to receiving the acknowledgment. The organization data packet has an associated OP header. The OP header may indicate, for example, the destination address. In particular, once the linked network path is successfully established and the corresponding acknowledgment is received, the first network device 114 may add an OP header to the organization data packets. For example, the OP header may include a set of data fields.

In an example, an encapsulating security payload (ESP) header may further be added on top of the OP header to the organization data packet. For example, the first network device 114 may create a new OP header for the organization data packet and use the OP header as the outermost header of the organization data packet, followed by the ESP header and then the original data packet. For example, the ESP trailer and the authentication data are appended to the payload. For example, the second network device 116 may send a security key along with the acknowledgment to the first network device 114 based on completing the linked network path using the cryptographic key data structure. Further, the first network device 114 may encrypt the organization data packet based on the security key associated with the cryptographic key data structure, such as the security key shared by the second network device 116, as well as the organization identifier. In this manner, both encryption and authentication are used to secure the organization's data packets.

At operation 310, the method 300 includes sending, by the first network device 114, the encrypted organization data packet to the second network device 116, via the linked network path. The encrypted organization data packet is sent across the encrypted linked network path. In this manner, the organization data packet may be transmitted to a destination address. It may be noted that organization data packets from different organizations may be made unique by encrypting them based on the corresponding organization identifier. Subsequently, the linked network path may be used to send organization data packets from different organizations. For example, the linked network path may be used to send organization data packets from the first organization 106 and the second organization 108. In particular, the service type associated with each of the first organization 106 and the second organization 108 is indicated within the OP header associated with the respective organization data packets, and the organization data packets are encrypted using the respective organization identifier of the first organization 106 and the second organization 108. The network traffic from the two organizations may not mix up during transmission across the linked network path and maintain isolation, thereby enabling a common secured tunnel. This may reduce the cost and delay associated with the transmission of organization data packets. Further, providing the secured linked network path and encrypting based on the key and the organization identifier may eliminate a need for high-end network security products to be deployed by the organization for, for example, encrypting, policing, blocking, and securing organization data packets, such as intrusion prevention system, firewall, endpoint security components, and so forth.

Figure 4:
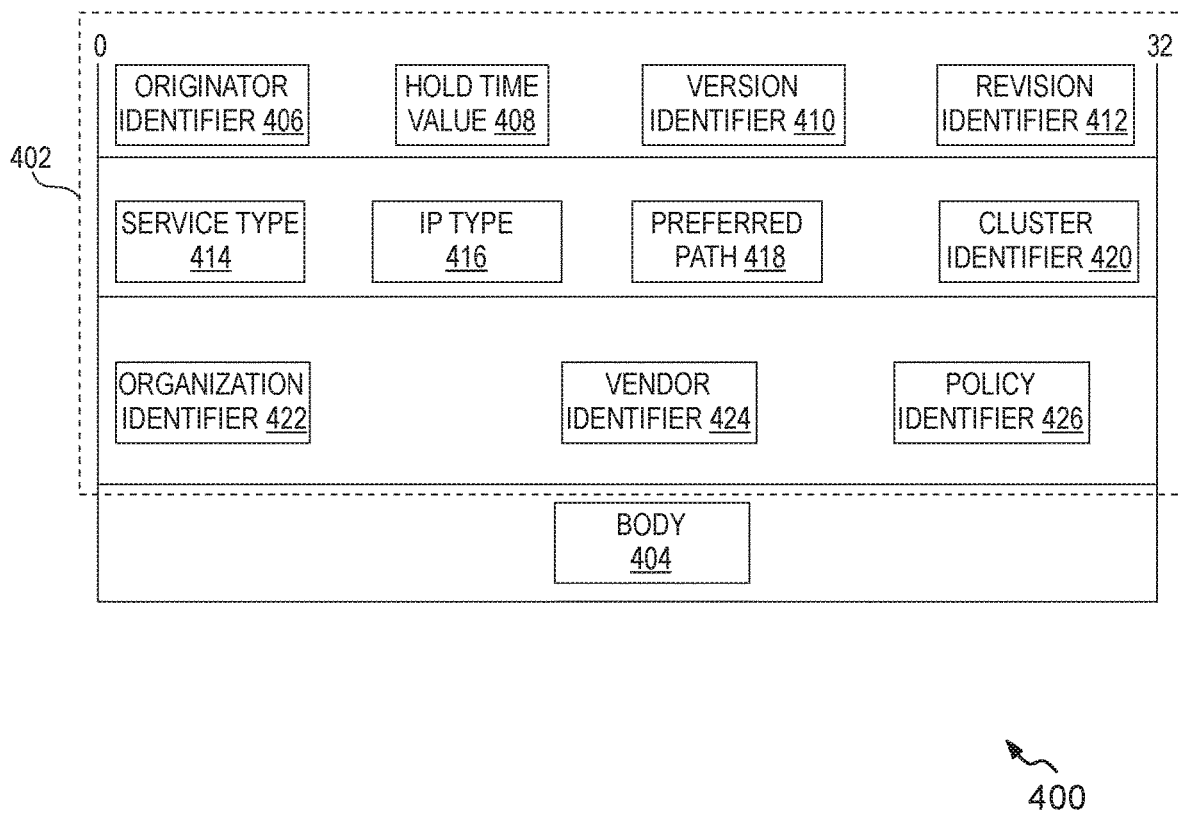
FIG. 4 shows an example representation of an organization data packet for sending across a secure linked network path, in accordance with an embodiment of the present disclosure.

FIG. 4 shows an example representation of an organization data packet 400 for sending across a secure linked network path, in accordance with an embodiment of the present disclosure. The organization data packet 400 may include an organization packet (OP) header 402 and a body 404. The OP header 402 includes a plurality of data fields. The OP header 402 includes a plurality of data fields. In an example, an OTGP session may be established between a first network device 114 within a first AS 102 and a second network device 116 within a second AS 104 for sending the organization data packet 400. For example, the first network device 114 may send a number of service messages to create and maintain a neighbor relationship link with the second network device 116. Once the second network device 116 is added as a trusted neighbor, the first network device 114 may send encrypted organization data packets, via the linked network path to the second network device 116. The organization data packet 400 may originate from a first organization 106 or a second organization 108 within the first AS 102. The first network device 114 is also associated with the first AS 102. For sake of explanation, the organization data packets 400 are considered to be generated by any of the nodes 110*a*-110*c* of the first organization 106.

In operation, the same OP header 402 formats may be used for a plurality of organization data packets communicated over the OTGP session. For example, the organization data packet 400 is transmitted on TCP port 399, or any other pre-configured communication port relating to any protocol, such as UDP, BGP, IGP, IPSec, and so on. For example, the pre-configured communication port may be configured by a representative of the organization or a vendor associated with the OTGP network devices. In an example, a plurality of organization data packets may be sent by the first network device 114 to the second network device 116 in an iterative manner or a parallel manner.

In an example, the first network device 114 may first send a connection request to the second network device 116. The connection request includes a cryptographic key data structure. For example, the connection request may reach the second network device 116 (i.e., edge OTGP router of the second AS 104) via a number of forwarding network devices, such as forwarding OTGP routers 204a-204c. In an example, a first forwarding OTGP router, say, forwarding OTGP router 204a may receive the connection request including the cryptographic key data structure from the first network device 114. For example, the connection request may be encoded and may only be decoded by edge routers. Thereafter, the first forwarding OTGP router may forward the connection request to a second forwarding OTGP router. The first forwarding OTGP router and the second forwarding OTGP router are positioned between the first network device 114 and the second network device 116. The second forwarding network device may forward the encoded connection request to the second network device 116. The second network device 116 receives the connection request, decodes the connection request to extract the cryptographic key data structure, and completes the linked network path. In this manner, the linked network path is established dynamically.

Once the linked network path is established, the second network device 116 sends an acknowledgment back to the first network device 114, via the linked network path. For example, the acknowledgment may include a cryptographic key based on the cryptographic key data structure and the linked network path. Using the cryptographic key returned as part of the acknowledgment and the organization identifier of the first organization 106, the first network device 114 may encrypt organization data packets generated by the first organization 106 for communication. In an example, the acknowledgment may have the same format as that of the connection request sent by the first network device 114. In an example, the length of the organization data packets may vary from 19 bytes (or octets) to 4096 bytes.

During the establishment of the linked network path, a tunnel is formed dynamically between the first network device 114 of the first AS 102 associated with a first ISP and the second network device 116 of the second AS 104 associated with a second ISP, using the cryptographic key data structure. In an example, the cryptographic key data structure may be a hash table having values corresponding to a number of parameters that are required to form the linked network path. For example, the linked network path may be a phase 1 IPsec tunnel. The hash table value may be shared amongst forwarding network devices in the first AS 102 and the second AS 104 to form a phase 1 IPsec tunnel. The parameters indicated in the cryptographic hash table may include, but are not limited to, authentication, encryption, security association (SA) Life, and key group. A value corresponding to the authentication may indicate a type of authentication for the organization data packet 400, for example, one of SHA-2, SHA-1, MD5, and so forth. A value corresponding to the encryption may indicate a type of encryption algorithm and length of the encryption key to be used for encrypting for the organization data packet 400, for example, one of DES, 3DES, AES, and so forth. A value corresponding to the SA life may indicate an amount of time until which the linked network path expires for the organization data packet 400, for example, one of SHA-2, SHA-1, MD5, and so forth. Further, a value corresponding to the key group may indicate a Diffie-Hellman key group.

Pursuant to the present disclosure, the first network device 114 sends the connection request including the cryptographic key data structure using OTGP routing information to reach its neighbor, (i.e., the second network device 116). The second network device 116 decodes the connection request and uses values corresponding to the parameters to form the linked network path. The first network device 114 sends the connection request, based on service information. The service information may correspond to the service requirements of the organization. The service information may include, for example, a service type and an IP type for sending data packets from the organization. To this end, the linked network path or phase 1 tunnel is formed without the manual configuration of the edge network devices (i.e., the first network device 114 and the second network device 116).

The linked network path, for example, the phase 1 IPsec tunnel, is formed based on the hash table value and forms a secured encrypted tunnel between the first network device 114 and the second network device 116, or the first AS 102 and the second AS 104, or the first organization 106 in the first AS 102 and another organization in the second AS 104. The organization data packet 400 generated by the first organization 106 is further encrypted separately, based on the requirement of the first organization 106. Requirement of the first organization 106 may be based on the service information and an organization identifier of the first organization 106. Different organizations that may use a common linked network path for data transfer may encrypt their organization data packets using their encryption methods and an associated organization identifier. Such encryption of the organization data packets may constitute phase 2 of the data transfer. Further, phase 2 may be configured on edge OTGP routers and/or service OTGP routers by an administrator of the first organization 106, for example, by providing the service information.

Returning to the present example, the organization data packet 400 includes the OP header 402 including a set of data fields. The set of data fields includes an originator identifier 406, hold time value 408, version identifier 410, revision identifier 412, service type 414, IP type 416, preferred path 418, cluster identifier 420, organization identifier 422, vendor identifier, 424, and policy identifier 426. The originator identifier 406 may carry data indicating an identifier corresponding to a source address of the organization data packet 400 or associated with the first network device 114.

The hold time value 408 may carry data indicating a holding time period to be waited before reflecting any route updates or fluctuations in the OP route table or OP routing information. In other words, any route updates or fluctuations in a network environment are not able to change route tables unless the update or fluctuation is stable for a time period corresponding to the hold time value 408. A value of the hold time value 408 may be in seconds, such as 10 seconds, 30 seconds, 50 seconds, and the like. The value of the hold time value 408 may be defined by the organization or by ISP.

The version identifier 410 may carry data indicating a version number of the OTGP running on the first network device 114. As may be understood, with each update in the OTGP, the version number may get incremented by, for example, 1. The revision identifier 412 may carry data indicating a version of may carry data indicating a unique id attached to OP route table whose value changes based on an update in the network.

The service type 414 may carry data indicating predefined or user-defined requirements of the data transmission from the first organization 106. The service type 414 may carry data indicating different services offered by an ISP and selected by the first organization 106. For example, the service type 414 may be indicated using 8 bits. Herein, the first 3 bits of the 8 bits may indicate precedence and the other 5 bits may indicate the type of service. In particular, the precedence bits may indicate the priority of the organization data packet 400. The higher the value of the precedence bits, the higher the priority of the organization data packet 400. Further, the type of service bits may define what kind of service is required by the first organization 106, based on delay, throughput, quality of service, and reliability. Different types of services may be offered by the ISP associated with the first AS 102 of the first organization 106. A network administrator of the first organization 106 may pre-define the requirements by providing service information or selecting a type of service for data transmission. Based on the service information, the service type metrics or parameters may be determined. Such services may include, for example, Multicasting, Internet service, VPN (L2 or L3), Remote VPN, Data forwarding (L2 or L3), Point-to-Point, Private line or MPLS, Video streaming (HD, 4K, 8K, and so forth), audio streaming, and data transfer. For example, the data transfer service type may utilize jumbo frames with high payload capacity for data transfer. It may be noted that the service type 414 may indicate service configured for the first organization 106 and may be determined based on the service information.

The IP type 416 may carry data indicating an IP preference of the first organization 106 for carrying out the transmission of the organization data packet 400. Different IP types may include, but are not limited to, IPv4, IPv6, and layer 2 frames. The IP type may also be one of: static, dynamic, public, and private. The preferred path 418 may carry data indicating a path from multiple high availability (HA) paths for transmission of the organization data packet 400. The preferred path 418 may be selected automatically based on metric calculation or based on user selection.

The cluster identifier 420 may carry data indicating a unique identifier, such as a group name, given to a cluster operating in the network environment, to which the first network device 114 may also belong. In an example, if edge network devices or service network devices belonging to different organizations have the same cluster identifier, then the same configuration settings, for example, routes policy, updates, and custom settings may be shared between the network devices under consideration of different organizations. For example, if the forwarding network device of an organization or an AS may have the same cluster identifier, then the same configuration setting may be shared with the different forwarding network devices within the organization or AS.

The organization identifier 422 may carry data indicating a unique identifier of the first organization 106. It may be understood that routing of the organization data packet 400 is performed based on the organization identifier 422 and service information associated with the first organization. The vendor identifier, 424 may carry data indicating a unique identifier of a vendor associated with the first network device 114. For example, the vendor identifier may be selected by an ISP associated with the first network device 114 to select a preferred vendor to forward traffic without altering the organization identifier.

The policy identifier 426 may carry data indicating policies applied for routing of the organization data packet 400. A value of the policy identifier 426 may indicate a policy that may be distributed among edge OTGP routers. As may be understood, the policy may include blocking policies, traffic shaping policies, throttling policies, and so forth, for routing of the organization data packet 400. Such policies may be based on the service type 414 associated with the organization data packet 400. For example, the policies may relate to routing across different layers of the networking model. It may be noted that although the present disclosure describes networking by way of sharing encrypted organization data packets among network devices based on service-oriented protocol. However, this should not be construed as a limitation. In other examples of the present disclosure, the embodiments described herein may not be used for networking by sharing encrypted organization data packets, but may be used for any communication between two electronic devices. In such an example, the two electronic devices may need to communicate for data transfer via, for example, satellite to satellite without the need for transponders. In particular, the two electronic devices may support Reach and Attempt state from RAIN architecture to take place in different mediums, such as satellite communication.

As it may be understood, the OP header 402 depicted in the present example is only illustrative. In other examples of the present application, the OP header 402 may further include data fields, such as peer status, time to live (TTL), a Length field, an Error field, a Header checksum, a destination address, a source address, VHOP and so forth.

Moreover, the organization data packet 400 includes a body field 404. The body field 404 maybe 10 bits to 32 bits long. Further, the body field 404 of the organization data packet 400 may include actual data corresponding to a message to be shared. For example, the message may be divided into different fragments or packets and the OP header 402 may be added to each of the packets for routing of the organization data packets to a corresponding destination. The body field 404 may include, for example, a request for a web service, an email, a message, a video stream, and so forth. In an example, during route advertisements, the body field 404 of the organization data packet 400 may include OP routing information. The OP routing information may include routing information for routing of the data packets, such as the organization data packet 400 generated by the first organization 106. For example, the OP routing information may include, but is not limited to, organization protocol (OP) IP routes, OP routing table, OP service table, OP link table, frames information, Ethernet frames, and VPN packets.

Figure 5:
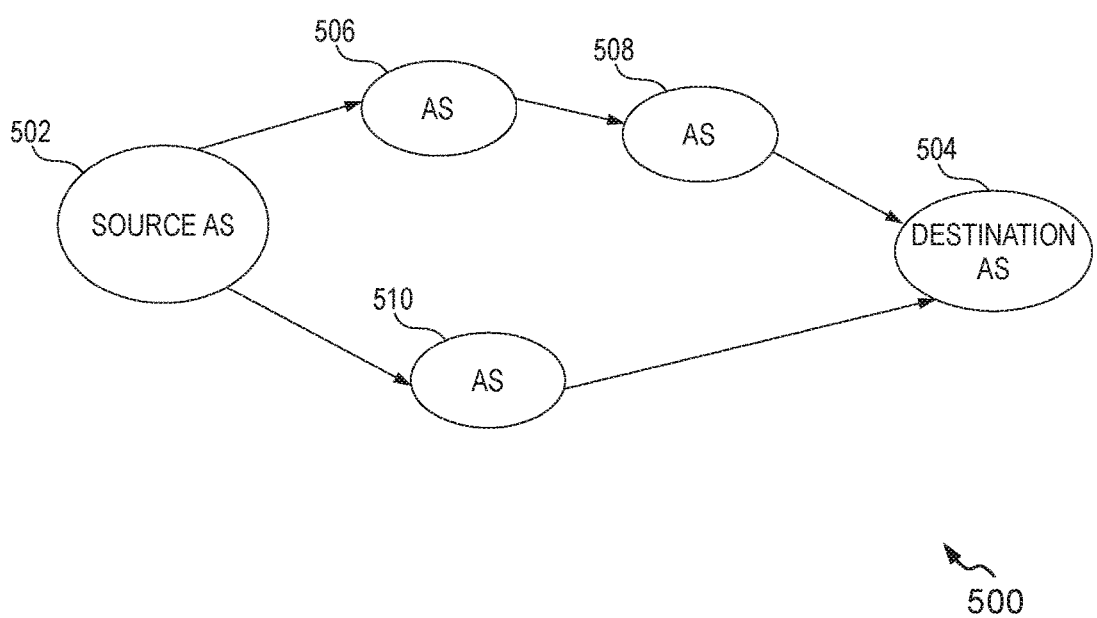
FIG. 5 is an example representation of the exchange of an organization data packet across a communication network, in accordance with an embodiment of the present disclosure.

FIG. 5 illustrates an example representation 500 of the exchange of an organization data packet across a communication network, in accordance with an embodiment of the present disclosure. As it may be understood, routing of data traffic across a public communication network, or the Internet, may be facilitated by a number of Internet service providers (ISP). An ISP may provide access to the Internet to its customers and enable the customers to access web services, such as web surfing, online shopping, video streaming, video conferencing, messaging, and so forth. In other words, an ISP may operate as a vendor to provide web services to its customers including organizations or independent customers. For example, the Internet may include internet protocols (IPs), network prefixes, and autonomous systems. IPs may be grouped into network prefixes, and network prefixes are grouped into autonomous systems. An AS may be an area configured to have a common routing policy and under the administration of a single ISP.

For communication of an organization data packet from its source to its destination, the organization data packet may hop from one AS to another AS until it reaches its destination. In particular, edge routers, specifically, edge OTGP routers, may receive an organization data packet and determine if a destination of the organization data packet is within an AS associated with the edge OTGP router. Based on the determination, the edge OTGP router may forward the organization data packet to a service OTGP router within the AS, to a destination IP of the organization data packet within the AS, or another edge OTGP router in another AS.

As depicted in FIG. 5, a source AS 502 communicates an organization data packet to a destination AS 504. For example, the organization data packet at the source AS 502 may be generated by a source organization within the source AS 502. Further, the destination AS 504 may include a destination organization, to which the organization data packet is to be transmitted.

For example, the source AS 502 may include one or more edge OTGP network devices (such as the first network device 114), one or more service OTGP network devices, and one or more forwarding network devices. Similar to the source AS 502, the destination AS 504 may include one or more edge OTGP network devices, such as the second network device 116; one or more service OTGP network devices; and one or more forwarding network devices.

Further, a number of autonomous systems, depicted as, AS 506, 508, and 510, may be present between the source AS 502 and the destination AS 504, or the source organization and the destination organization. The autonomous systems 506, 508, and 510 between the source AS 502 and the destination AS 504 may be associated with different ISPs. For example, the source AS 502 may belong to ISP A, the destination AS 504 may belong to ISP B, and autonomous systems 506, 508, and 510 may belong to ISP C, ISP D, and ISP E, respectively.

As described above, the organization data packet 400 may have an OP header 402. The OP header 402 of the organization data packet 400 may include a set of data fields. Moreover, values corresponding to the set of data fields may enable routing of the organization data packet 400 across a communication network 118 from the source AS 502 to the destination AS 504. For example, the set of data fields may include, but are not limited to, organization identifier 422, vendor identifier 424, VHOP value, hold time value 408, policy identifier 426, and cluster identifier 420, among others. Further, as may be understood from FIG. 5, there exist two routes or paths for communicating an organization data packet from the source AS 502 to the destination AS 504. In an example, a first path may be source AS 502, to AS 506, to AS 508, to the destination AS 504; and a second path may be source AS 502, to AS 510, to the destination AS 504. When the organization data packet traverses across autonomous systems 506-510 to reach the destination AS 504, values corresponding to certain data fields from the set of data fields may change.

Initially, at the source AS 502, an edge OTGP router of the source AS 502 may set a VHOP value in the OP header 402 of the organization data packet to 0. Moreover, the edge OTGP router of the source 502 may send the organization data packet to the AS 506. The edge OTGP router of the source AS 502 may have established a neighbor relationship link and a linked network path with an edge OTGP router of the AS 506. Once the edge OTGP router of the AS 506 receives the organization data packet, it may increment the VHOP value to 1. Further, the edge OTGP router of the AS 506 may add a value of organization identifier associated with the source organization to the organization identifier field 422. The organization identifier may be a unique series of numbers allocated to the source organization. In an example, the organization identifier of the source organization may be the same as the autonomous system number (ASN) of the source AS 502. Further, the edge OTGP router of the AS 506 may add an identifier, such as a name or a number, of the ISP-C associated with the AS 506 to the vendor identifier field. For example, the edge OTGP router of the AS 506 may add 'C' to the vendor identifier field. Thereafter, the edge OTGP router of the AS 506 may transmit the organization data packet to the AS 508, specifically, an edge OTGP router of the AS 508, with which it has established a neighbor relationship link and linked network path. The edge OTGP router of the AS 508 increments the VHOP value to 2, and further adds an identifier of the ISP-D associated with the AS 508 to the vendor identifier field. For example, the edge OTGP router of the AS 508 may add 'D' to the vendor identifier field, thereby making the value of the vendor field 'CD'. It may be noted that the value of the organization identifier field remains unchanged or constant throughout the traversal of the organization data packet. Finally, the edge OTGP router of the AS 508 may send the organization data packet to the destination AS 504, specifically, the edge OTGP router of the destination AS 504. The edge OTGP router of the destination AS 504 may increment a VHOP value to '3', the value of the organization identifier field may be the same, i.e., organization identifier of the source organization, and value of the vendor identifier field may be 'CDB'.

Alternatively, the organization data packet may traverse through the second path. Initially, at the source AS 502, the edge OTGP router of the source AS 502 may set a VHOP value in the OP header of the organization data packet to 0. Moreover, the edge OTGP router of the source AS 502 may send the organization data packet to the AS 510, specifically, an edge OTGP router of the AS 510. The edge OTGP router of the AS 510 may increment the VHOP value to 1. Further, the edge OTGP router of the AS 510 may add the value of organization identifier associated with the source organization to the organization identifier field and may add an identifier 'E' associated with the AS 510 to the vendor identifier field. Thereafter, the edge OTGP router of the AS 510 may send the organization data packet to the destination AS 504, specifically, the edge OTGP router of the destination AS 504. The edge OTGP router of the destination AS 504 may increment a VHOP value to '2', the value of the organization identifier field may be the same, i.e., organization identifier of the source organization, and value of the vendor identifier field may be 'EB'.

It may be noted that the value of the organization identifier field is constant throughout the traversal of the organization data packet across either the first path or the second path. The organization identifier indicates a service type that further indicates requirements of the source organization to be met for routing of the organization data packet. Since the organization data packet traverses through different vendors or autonomous systems administered by different ISPs, the value of the vendor identifier field keeps on changing. In particular, the vendor identifier associated with different vendors of the AS hopped by the organization data packet is appended to the vendor identifier field. Further, the VHOP value is incremented when the organization data packet passes through edge routers of different vendors or autonomous systems.

In a case where the organization data packet is sent during a route advertisement, a path having the shortest VHOP may win and be selected as a preferred path. However, in cases where a user selects the preferred path, the user may manipulate the upper limit of the VHOP value to use a desired selected path.

Figure 6:
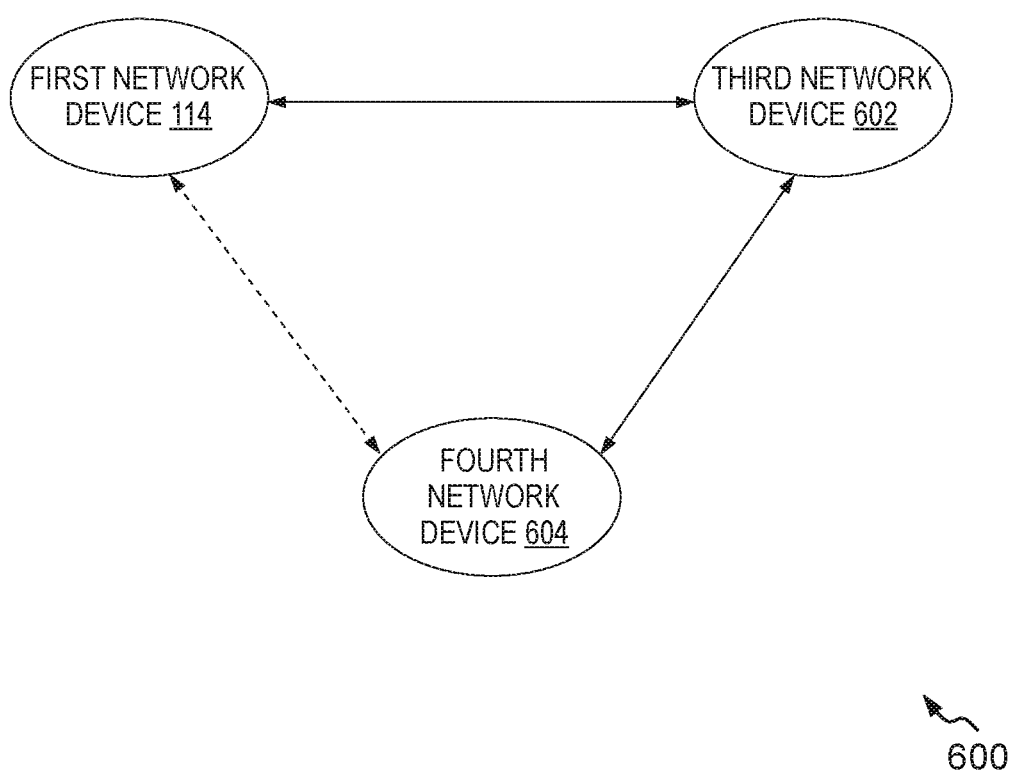
FIG. 6 is an example representation of route exchange advertisement within an organization, in accordance with an embodiment of the present disclosure.

FIG. 6 illustrates an example representation 600 of exchange of a route advertisement within an organization, in accordance with an embodiment of the present disclosure. For example, the organization may be within an autonomous system, or the organization may form an autonomous system. For ease of explanation, the organization may be the first organization 106 within the first AS 102. As described above, the first AS 102 may include a first network device 114. The first network device 114 may be an edge OTGP router for the first AS 102.

Pursuant to the present example, the first AS 102 may further include a third network device 602 and a fourth network device 604. For example, the third network device 602 and the fourth network device 604 may be an edge OTGP router for the first AS 102, a service OTGP router for the first organization 106, or a forwarding OTGP router within the first organization 106. For example, the first network device 114 may be configured to share the route advertisement with other network devices, i.e., the third network device 602 and the fourth network device 604, in case of an update or modification in the OP routing information or when initiating operation.

In this regard, the first network device 114 may determine a link-state network path for sharing the route advertisement with other network devices. For example, a preferred path may be determined to be used as the link-state network path for sending the route advertisement. In an example, the preferred path may be determined based on a principle that routes advertised on a path will not be used for route advertisement, i.e., if route advertisement is sent from the first network device 114 to the third network device 602 on a linked interface, then the linked interface may not be used to reverse-forwarding the route advertisement from the third network device 602 back to the first network device 114.

For sharing the route advertisement with the other network device within the first organization 106, a linked interface may have to be established between two network devices in a manner such that an active link-state network path can be formed. As may be understood, multiple paths may exist to reach, for example, the fourth network device 604 from the first network device 114. At a given time, a single path, for example, corresponding to the preferred path may be activated to be used as a linked state network path and to forward data packets for route advertisement. Before sending route advertisements on the link-state network path, a neighbor relationship link or linked interface between neighbors may have to be formed. In order to form a linked interface between two network devices, for example, the first network device 114 and the third network device 602, a plurality of service messages may be exchanged between the two network devices 114 and 602. In an example, the plurality of service messages may include:

(a) 'REACH' service message including 'Hello' data packet for discovering the third network device 602 and checking if the third network device 602 is listening on a pre-configured OTGP communication port.
(b) 'ATTEMPT' service message including 'Confirming' data packet for negotiating a set of parameters with the third network device 602. The set of parameters may be based on the service information, such as IP type, service type, cluster id, version identifier, and preferred path.
(c) 'INTERCONNECT' service message including 'Link' data packet for forming neighbor relationship link with the third network device 602 and ensuring full reachability to the other network devices.
(d) 'NETWORK' service message including 'data transfer' data packet. The 'NETWORK' service message may be populated with the organization data packet, vendor data packet, and OP routing information indicating organization policy and services desired as per organization needs or the service information.

In this manner, a linked interface is formed between the network devices 114 and 602, using RAIN architecture. In the linked interface, the network devices 114 and 602 are configured based on the service information, such as service type. IP type, preferred path selected by an administrator of the first organization 106. In a similar manner, a linked interface may be formed between the third network device 602 and the fourth network device 604. The fourth network device 604 may also be configured based on the service information. The linked interface may form an active path or the link state network path within the first organization 106 or the first AS 102. Moreover, the link state network path may not form a full mesh within the first organization 106 network. The route advertisement shared over the link state network path also does not require a route reflector router.

An example of a manner in which the route advertisement is shared in explained as follows. For example, a link state network path for route advertisement may be first network device 114 to the third network device 602 to the fourth network device 604. Subsequently, a linked interface may be formed between the first network device 114 and the third network device 602, and another linked interface may be formed between the third network device 602 and the fourth network device 604. In other examples of the present disclosure, a different number of network devices may be included within the first AS 102 or the first organization 106. In such cases, multiple possibilities of link state network path may exist. Further, the link state network path may be determined based on the preferred path 418 that may be based on metric calculation or may be user-selected by an administrator of the first organization 106.

In operation, the first network device 114 may send data packets relating to the route advertisement to the third network device 602, via the linked interface between the first network device 114 and the third network device 602. The route advertisement may include the OP routing information associated with the first organization 106. The third network device 602 is configured to not use the linked interface between the first network device 114 and the third network device 602 for forwarding the route advertisement or reverse-forwarding the route advertisement back to the first network device 114. Further, the third network device 602 is configured to send the data packets relating to the route advertisement to the fourth network device 604, via the linked interface between the third network device 602 and the fourth network device 604. The fourth network device 604 is configured to not use the linked interface between the third network device 602 and the fourth network device 604 for forwarding the route advertisement or re-sending the route advertisement back to the third network device 602.

For example, an unlinked interface may exist between the first network device 114 and the fourth network device 604. The unlinked interface may be a communication path that may not be an active path and may not be a part of the link state network path. Therefore, the fourth network device 604 may not send the route advertisement back to the first network device 114. However, the unlinked interface may be a communication link that may be activated in cases of, for example, change in linked state network path, fault on the existing linked state network path, communication of organization data packets, or route poisoning.

In an example, a unique revision identifier may be associated with the OP routing information. For example, the revision identifier may be created when the first network device 114 may access the OP routing information during its set-up. The revision identifier may indicate a version of the OP routing information that is being advertised. During route advertisement, the first network device 114 may share the revision identifier of the OP routing information with the third network device 602. Subsequently, the third network device 602 may share the revision identifier with the fourth network device 604. The value of the revision identifier may change when OP routing information is updated.

In an example, the fourth network device 604 may receive new updates with regard to OP routing information. As may be understood, route poisoning may have occurred of routes indicated in the existing OP routing information. In such a case, the fourth network device 604 may update the revision identifier and forward a new route advertisement indicating the new update to the first network device 114. Based on the user policy specified in the service information, the first network device 114 may either accept it, delete it, or ignore it. In case the first network device 114 accepts the new route advertisement, the first network device 114 may update the existing OP routing information and increment the revision identifier, for example, to the updated revision identifier. Further, the first network device 114 may send an updated route advertisement for the first AS 102 or the first organization 106 comprising the updated OP routing information associated with the first organization 106 along with updated revision identifier to other network devices, based on the linked state network path, i.e., to the third network device 602. In case the first network device 114 ignores or deletes the new route advertisement, the first network device 114 may notify the fourth network device 604 to continue to use the old revision identifier and the OP routing information.

As the routing advertisement is shared on a linked interface between two network devices, broadcasting of the OP routing information is eliminated. This enhances the security of the connection between network devices and the network is optimized due to less data congestion or traffic that may be caused due to broadcasting.

As per the present disclosure, a route advertisement is sent to a neighbor network device via a linked interface. The route advertisement may include OP routing information including route tables, hop information, routes information, user policies, and the like. During sharing the route advertisement, a loop prevention mechanism is applied that prevents sending of a route advertisement back to its source, i.e., the first network device 114. The loop prevention mechanism works on the logic of revision identifier associated with each route table within the OP routing information. In case of route poisoning, an updated route advertisement may be sent back to the source. High availability (of linked and unlinked interfaces) is used to manipulate paths in case of failure. For example, a preferred path for traversal of data packets is determined based on VHOP values.

FIGS. 7A-7F illustrate various example representations of high availability interfaces between network devices 702 and 704, in accordance with an embodiment of the present disclosure. The network devices 702 and 704 may be configured with an OTGP. The network devices 702 and 704 may be any of an edge OTGP router, service OTGP router, and forwarding OTGP router. Further, the network devices 702 and 704 may be within an organization, such as within the first organization 106; within an autonomous system, such as within the first AS 102; or may belong to different autonomous systems.

In a high availability environment, several network interfaces may be established between the network devices 702 and 704. In particular, the network interfaces may be established based on the exchange of a plurality of service messages. Further, the linked interface may be used for sharing route advertisement. Based on the route advertisement, a neighbor relationship link may be formed between networks, when the network devices 702 and 704 lie in proximity to each other. In cases where an organization data packet may have to be routed through the network devices 702 and 704 to send it to a corresponding destination, a secure linked network path may be formed between the network devices 702 and 704. Such a linked network path is formed based on the service requirements of a source organization from where the organization data packets originate. Further, encrypted organization data packets may be transmitted through the linked network path. Such organization data packets may be encrypted based on an organization identifier associated with the source organization.

For example, the network device 702 may send a route advertisement to the network device 704, via a linked interface. The route advertisement may include OP routing information. Initially, a value of a revision identifier of the OP routing information may be, for example, 1. When there are route changes in the network architecture, route tables within OP routing information may be updated. Subsequently, the revision identifier may be incremented, for example, to 2, following the update of the OP routing information. Based on routing policies defined by the OTGP and/or defined by an organization or an AS associated with the network devices 702 and 704, the updated OP routing information along with the updated revision identifier may be advertised to the peers. Moreover, based on the routing policies, the updated may be accepted or ignored. The OP routing information may include route tables. The route tables may include all possible routes and/or networks that a network device may have learned from all peers, neighbors, directly connected network, or received from a network administrator.

It may be noted that there may be several topologies in which interfaces may be formed between the network devices.

Figure 7A:
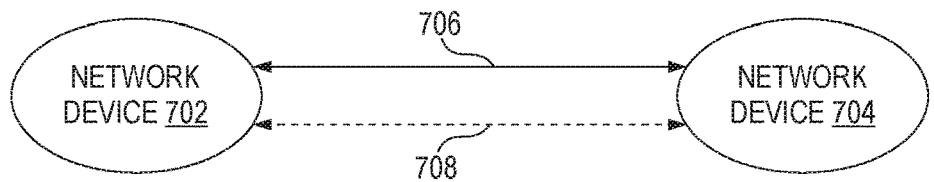
FIGS. 7A-7F illustrate various example high availability interfaces between network devices, in accordance with an embodiment of the present disclosure.

Referring to FIG. 7A, dual network interface including a first interface 706 and a second interface 708 may be established between the network device 702 and 704. The first interface 706 may be a linked first interface 706, i.e., active path between the network devices 702 and 704. Using the linked first interface 706, route advertisement, plurality of service messages, and connection requests may be exchanged between the network device 702 and 704. In case of a failure of the linked first interface 706, the linked state may shift to the second interface 708. Subsequently, the second interface 708 may become active and form a linked interface. When the fault at the first interface 706 is cleared, the first interface 706 may pre-empt and resume operation as a linked interface. When the first interface 706 resumes operation as a linked interface, an existing revision identifier of the OP routing information may be sent. This may avoid any missing new routes that may have been added due to maintenance or outage.

Figure 7B:
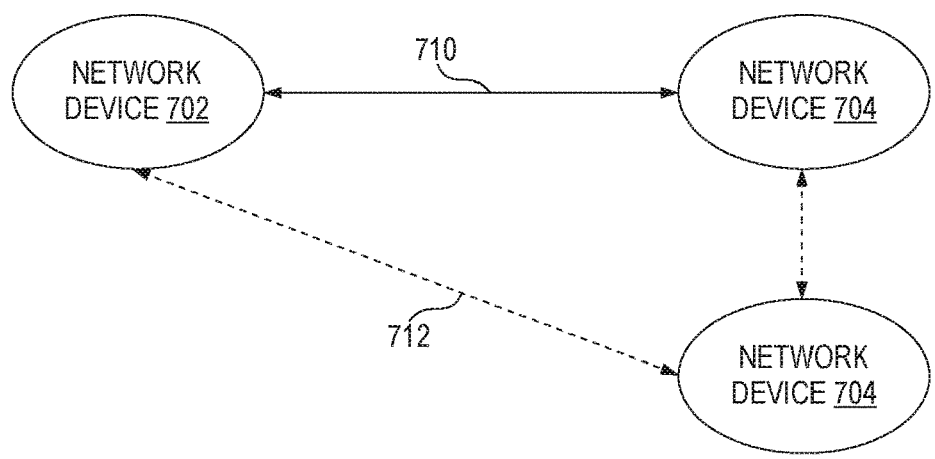

Referring to FIG. 7B, a linked interface 710 may be formed between the network device 702 and a first instance of the network device 704, and an unlinked interface 712 may be formed between the network device 702 and a second instance of the network device 704.

Figure 7C:
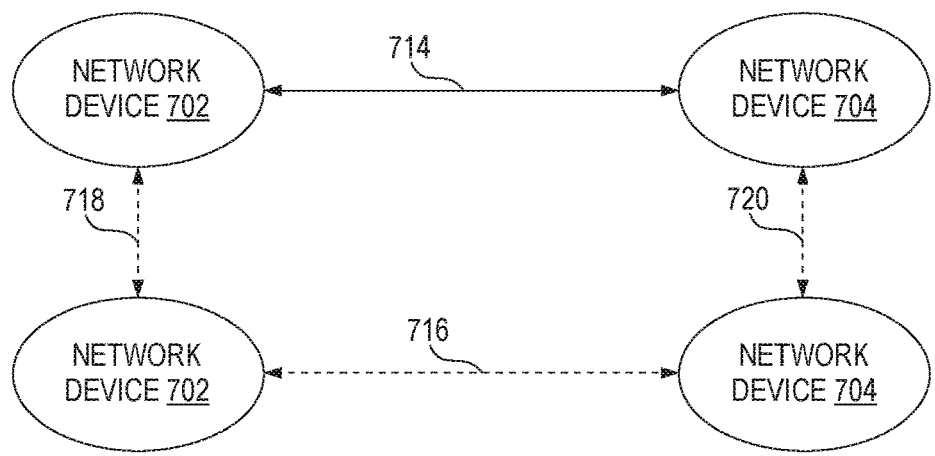

Referring to FIG. 7C, a linked interface 714 may be formed between the first instances of the network devices 702 and 704 and an unlinked interface 716 may be formed between the second instances of the network devices 702 and 704. Moreover, an unlinked interface 718 may be formed between the first and the second instances of the network device 702, and an unlinked interface 720 may be formed between the first and the second instances of the network device 704.

Figure 7D:
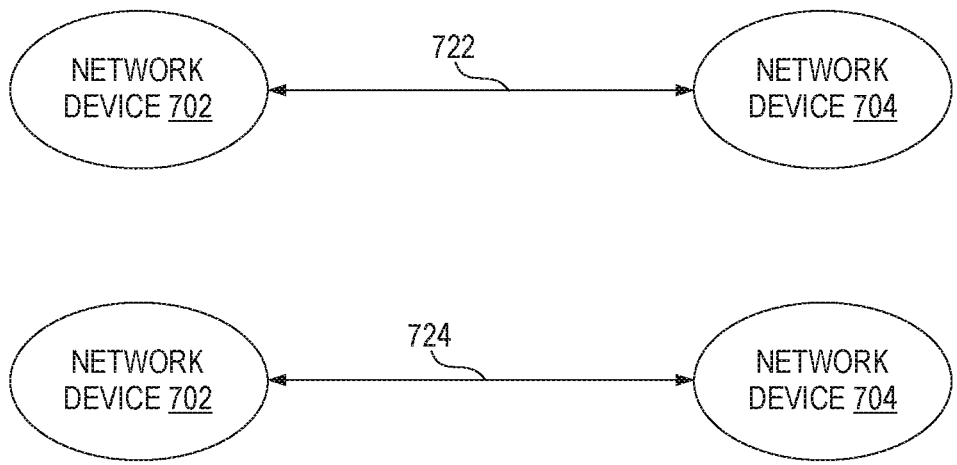
Figure 7E:
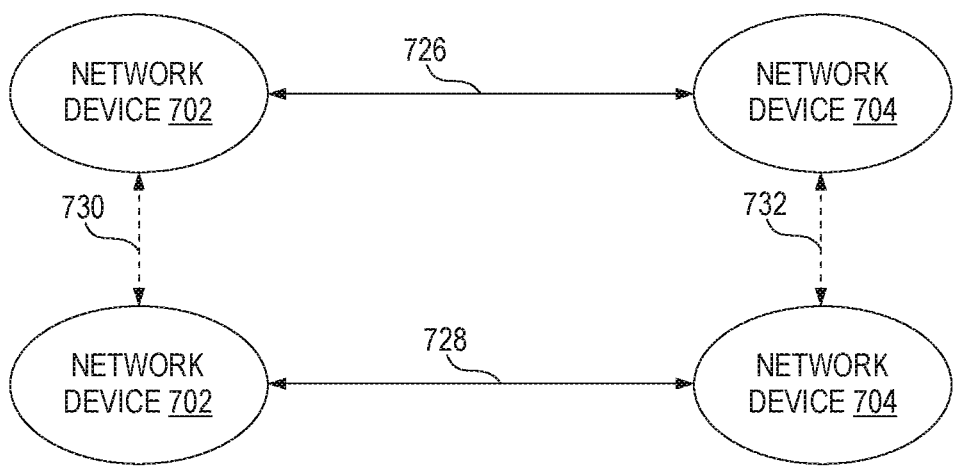
Figure 7F:
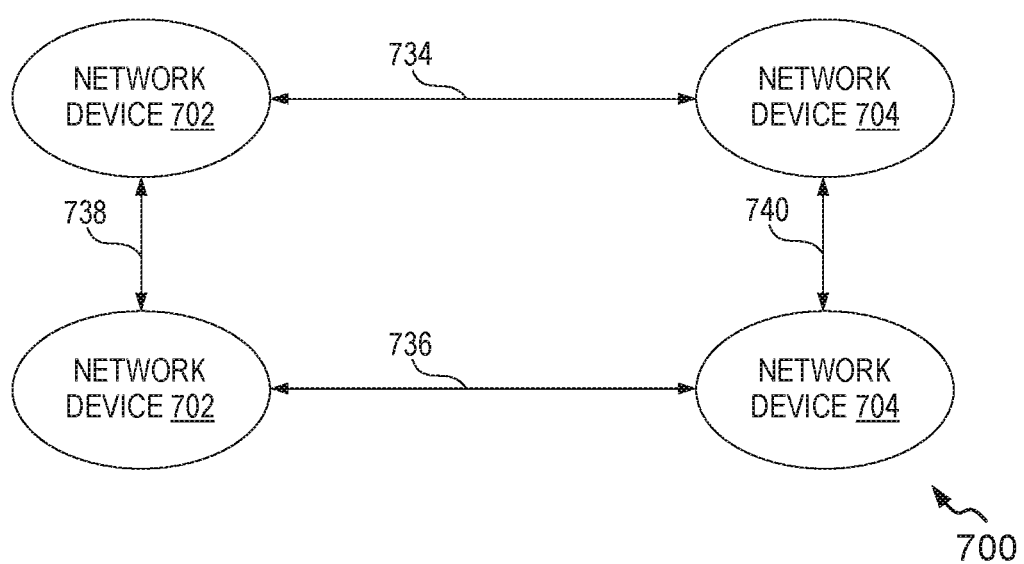

In FIGS. 7D-7F, active-active interfaces or linked paths between two interfaces of the network devices 702 and 704 are formed. For example, first instances of the network device 702 and 704 may be configured with the first version of OP routing information having revision identifier '1', and second instances of the network device 702 and 704 may be configured with a second version of OP routing information having revision identifier '2'.

Referring to FIG. 7D, a linked interface 722 may be formed between the first instances of the network devices 702 and 704 and another linked interface 724 may be formed between the second instances of the network devices 702 and 704. Moreover, the first instances of the network device 702 and 704 may not be connected with corresponding second instances of the network devices 702 and 704.

Referring to FIG. 7E, a linked interface 726 may be formed between the first instances of the network devices 702 and 704, and another linked interface 728 may be formed between the second instances of the network devices 702 and 704. Moreover, an unlinked interface 730 may be formed between the first and the second instances of the network device 702, and an unlinked interface 732 may be formed between the first and the second instances of the network device 704.

Referring to FIG. 7F, an active-active interface 700 is shown. A linked interface 734 may be formed between the first instances of the network devices 702 and 704 and another linked interface 736 may be formed between the second instances of the network devices 702 and 704. Moreover, a linked interface 738 may be formed between the first and the second instances of the network device 702, and a linked interface 740 may be formed between the first and the second instances of the network device 704.

Figure 8:
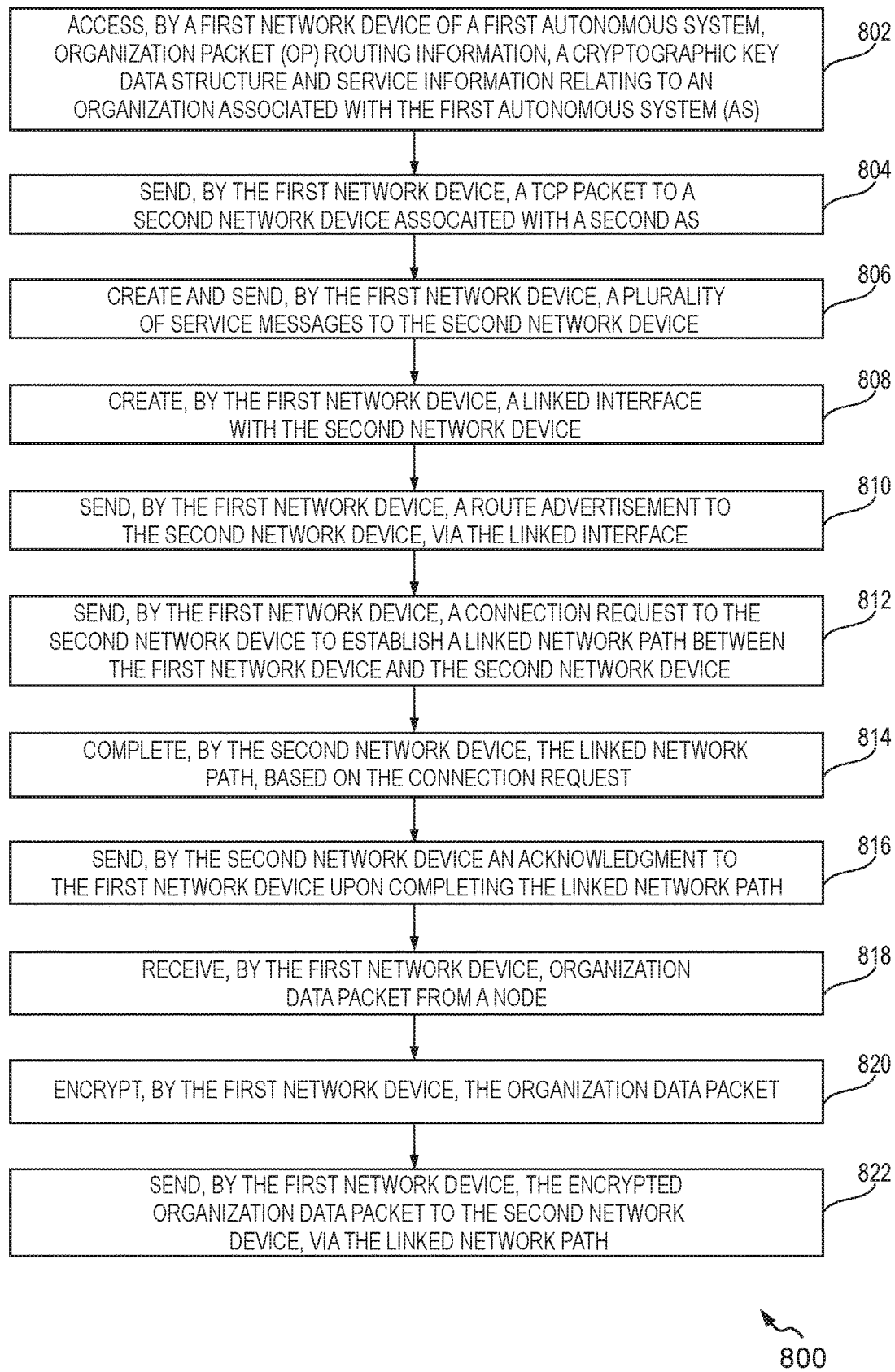
FIG. 8 is a process flow of exchanging organization data packet between two network devices according to organization transit gateway protocol, in accordance with an embodiment of the present disclosure.

FIG. 8 is a process flow 800 of exchanging organization data packet between two network devices according to organization transit gateway protocol, in accordance with an embodiment of the present disclosure.

At 802, organization packet (OP) routing information, a cryptographic key data structure, and service information relating to an organization associated with a first autonomous system (AS) 102 are accessed by a first network device 114. In this regard, the first network device 114 may retrieve the OP routing table that may include a number of route tables including, for example, information pertaining to peer network devices having a physical link with the first network device 114. Moreover, the OP routing information and the service information may be retrieved based on an organization identifier of the organization within the first AS 102.

In an example, the organization identifier for the organization may be allocated to the organization at a time of registry. The organization may register with an Internet service provider (ISP) to avail services offered by the ISP, such as web services, email services, video streaming services, and the like. To this end, the organization may also select a service type or service plan based on the requirements of the service. In an example, the service type may be one or more of: the first service for only Internet service, a second service for the Internet as well as DTH services, the third service for network security with the Internet service, the fourth service for encryption based on organization identifier and network security along with the Internet service, and so on. It may be noted that the above-described services are only illustrative, and the ISP may offer a plurality of different services based on different technology offerings by the ISP, cost, and requirements of the organization. The ISP may then assign an organization identifier to the organization and store service information (or selected service type) relating to the organization in conjunction with the organization id. In certain cases, the organization may build a custom service based on their requirements.

Pursuant to the present disclosure, the ISP or a central database associated with the first AS 102 may assign a unique organization identifier to the first organization 106, for example, based on autonomous system number (ASN) associated with the first autonomous system 102. The ISP may also associate a vendor identifier with the organization identifier. The vendor identifier may be a unique identifier associated with the ISP or vendor of network hardware products used by the organization for connecting with the first AS 102. By associating the vendor identifier with the organization identifier, the ISP may select a preferred vendor ID.

For example, an administrator associated with the first organization 106 may select a service type for the organization. The administrator may further add nodes, such as nodes 110a, 110b, and 110c to an organization network. In particular, on registering with the ISP, an organization network may be established with the organization id. The nodes 110a-110c may connect to the organization network to access web services offered by the ISP via the organization network. Although multiple organization nodes are described in the present example, however, in some cases a single organization node may be present within an organization. To this end, the organization network may connect to a first AS 102 network to avail services from the ISP and further provide services to the nodes 110a-c.

The first AS 102 includes the first network device 114 for routing of organization data packets outside of the first AS 102, such as to a second AS 104. For example, the first network device 114 may be an edge network device for the first AS 102. In certain cases, the first AS 102 may also include other network devices, such as a service network device (or service OTGP router), forwarding network device (or forwarding OTGP routers), and other edge network devices. To this end, only the edge network devices, for example, the first network device 114 may be capable of sending encoded route advertisements and updating or modifying OP routing information. Further, the service network device may be configured to route and forward data packets. The forwarding network device may forward data packets across the organization network or within the first AS 102.

The first AS 102 may correspond to the organization network or may include multiple organization networks. In cases where multiple organization networks are present within the first AS 102, different network devices may be responsible for the routing of data packets from different organization networks.

At 804, the first network device 114 sends a TCP packet to a second network device 116. Based on a routing table, the first network device 114 determines which interface/routing protocol or route is needed to reach the second network device 116 to initiate an OTGP session. For example, the first network device 114 sends the TCP packets to check if the second network device 116 is listening on a pre-configured TCP port, for example, TCP 399 port. In this manner, the first network device 114 checks if the second network device 116 is reachable or pingable in the first place.

At 806, the first network device 114 creates and sends a plurality of service messages to the second network device 116. The first network device 114 may send the plurality of service messages to a peer network device that is pingable on a pre-configured communication port to establish a stateful neighbor relationship link, iteratively. At first, the first network device 114 sends a first service message to the second network device 116 that includes data relating to the 'REACH' operation to initiate probing or discovery of any peer, such as the second network device 116. The probing is performed based on the pre-configured port at which the second network device 116 is listening for the OTGP session. Thereafter, the first network device 114 sends a second service message to the second network device 116 that includes data relating to an 'ATTEMPT' operation to perform negotiation of a set of parameters relating to data transfer, between the first network device 114 and the second network device 116. The set of parameters may be based on the service type defined by the organization administrator. Further, the first network device 114 sends a third service message to the second network device 116 that includes data relating to an 'INTERCONNECT' operation to establish a neighbor relationship link with the second network device 116 based on at least the set of parameters. After each of the plurality of service messages, the second network device 116 may send an acknowledgment to the first network device 114. This way the first network device may ensure that the second network device 116 is fully reachable.

At 808, the first network device 114 creates a linked interface with the second network device 116. To ensure high availability in the network architecture, multiple paths may be provided for a single service. For example, multiple network interfaces may exist between the first network device 114 and the second network device 116. The first network device may perform a k-metric calculation to determine a preferred path between the first network device 114 and the second network device 116. For example, the preferred path may include certain other network devices, such as service network devices and/or forwarding network devices that may be positioned between the first network device 114 and the second network device 116. In an example, the preferred path may be user-selected and may be explicitly configured by a user or a network administrator of the organization, for example, by changing a preferred path value or a VHOP value. The preferred path may be activated to form the linked interface.

In an example, a service network device of the organization may be connected to an edge network device (or the first network device) of the first AS 102. The first network device 114 is associated with the ISP with which the organization registers. During set-up, the first network device 114 may access OP routing information from the ISP, based on the organization identifier. The OP routing information may include route tables that are already filled. Moreover, during the set-up, all network devices within the first AS 102 may learn about each other, based on service information. In particular, based on the service type and IP type of the service selected by the organization, the linked interface may be formed between the plurality of network devices within the first AS 102. It may be noted that the linked interface of the plurality of network devices within the first AS 102 may be formed based on vendor identifiers associated with the ISP. It may be noted that the plurality of network devices within the first AS 102 may be within the vendor identifier and the exit point is the first network device 114.

The organization data packet may be forwarded by the service network device to the first network device 114. It may be noted that the vendor identifier and the organization identifier are separate and don't interfere with each other even if they are the same. Further. VHOP value may be changed based on hopping from different edge network devices.

At 810, the first network device 114 sends a route advertisement to the second network device 116, via the linked interface. In an example, the route advertisement may also be sent to other edge network devices within the first AS 102, and any other network device that the first network device 114 may want to form neighbor relationship link with. For example, the first network device 114 may encode the route advertisement. The route advertisement may only be decoded by other edge network devices or service network devices. Further, the route advertisement may be sent over an active path, i.e., the linked interface that may be established based on the services selected by the organization. For example, the forwarding network devices on the linked interface may only forward the route advertisement may not be capable to decode it. In an example, the linked interface may be determined based on a principle that routes advertised on a path will not be used for route advertisement, i.e., if route advertisement is sent from the first network device 114 to the second network device 116 on a linked interface, then the linked interface may not be used to reverse-forwarding the route advertisement from the second network device 116 back to the first network device 114.

In an example, the route advertisement may include the OP routing information. The first network device 114 may, for example, access the OP routing information from a database of an ISP associated with the first AS 102, or may be injected with the OP routing information by a network administrator during set-up. The first network device 114 may maintain the OP routing information within a memory associated therewith, or on the cloud, such as SD-WAN. For example, the OP routing information includes an OP route table, an OP service table, and an OP link table. The OP route table may maintain a plurality of organization identifiers associated with a plurality of organizations that the first network device may know of and how to reach or route the. For example, if the OP route table includes six organization identifiers corresponding to six organizations, then the first network device knows how to reach each of the six organizations, for example using which vendor identifier for packet forwarding. Subsequently, in OTGP, the OP route table indicating organization identifiers is used to determine hops of a data packet.

The OP service table indicates all services in use or available to use on all edge routers, i.e., what services are supported by different edge network devices along each of the routes to reach various organizations that are indicated in the OP route table. This enables the first network device 114 to determine which path or route will fulfill customer or organization requirements. For example, an OP route table of the first network device 114 includes 2 organizations, i.e., ORG1 and ORG2, and the OP service table indicates the service of VPN and internet services. When a service requirement of the organization within the first AS 102 is of VPN, then the first network device 114 may select the path which has service links of VPN in between them. It may be noted that data packets from different organizations and having different service requirements are forwarded in the data plane. Therefore, when VPN is selected that means the data plane is optimized for VPN traffic only. Moreover, the OP link table may include a list of all active connected neighbors with service within a vendor identifier network of the first network device 114. The OP link table may also include all other high availability paths for the neighbors.

For example, the OP routing information is determined based on the service information.

For example, the first network device 114 may send the route advertisement as a service message, i.e., a fourth service message that indicates 'NETWORK' operation to initiate data transfer between the first network device 114 and the second network device 116. For example, a body of the NETWORK service message may include the OP routing information for routing of data packets. The 'NETWORK' service message may also be used to exchange organization protocol (OP) IP route, frames information, VPN information, and so forth.

At 812, the first network device 114 sends a connection request to the second network device 116 to establish a linked network path between the first network device 114 and the second network device 116. The connection request includes the cryptographic key data structure and the service information. For example, the connection request may also be sent to the network device lying between the first network device 114 and the second network device 116, i.e., on a path between the first network device 114 and the second network device 116.

At 814, the second network device 116 completes the linked network path, based on the connection request. In an example, the linked network path may be a phase 1 IPsec tunnel. Further, the second network device 116 completes the linked network path using the cryptographic key data structure. In an example, the cryptographic key data structure may be a hash table. In such a case, the second network device 116 uses a hash table value for encryption methods and to establish a secure linked network path. It may be noted that the network device between the first network device 114 and the second network device 116, through which the connection request may be routed, may contribute to building the linked network path dynamically based on the cryptographic key data structure.

For example, there may be two edge network devices, say the first network device 114 and a third network device 602, and a number of forwarding network devices within the first AS 102. In such a case, if the third network device 602 lies between the first network device 114 and the second network device 116, i.e., is a part of the linked interface, then forwarding network device between the first network device 114 and the third network device 602 may build the linked network path till it reaches edged network device, i.e., the third network device 602.

At 816, the second network device 116 sends an acknowledgment to the first network device 114 upon completing the linked network path. For example, the second network device 116 sends the acknowledgment back to the source, i.e., the first network device 114 to notify it that phase 1 is complete. The acknowledgment may also include a security key associated with the cryptographic key data structure, based on which the phase 1 linked network path is built.

At 818, the first network device 114 receives the organization data packet from a node. The node may be one of the first set of nodes within the organization or the organization network. For example, a first forwarding network device from the plurality of network devices within the first AS 102 may be positioned between the node and the first network device 114. In such a case, the node may send the organization data packet to the first forwarding network device, and the first forwarding network device may further forward the organization data packet to the first network device 114.

At 820, the first network device 114 may encrypt the organization data packet. For example, the first network device 114 may encrypt the organization data packet based on the security key returned by the second network device 116 and/or the cryptographic key data structure values. Further, the first network device 114 may encrypt the organization data packet based on the organization identifier associated with the organization of the node. In certain cases, the first network device 114 may retrieve a device identifier associated with the node that sends the organization data packet and further encrypts the organization data packet based on the device identifier of the node. The device identifier may be, for example, the MAC address of the node.

At 822, the first network device 114 sends the encrypted organization data packet to the second network device 116, via the linked network path. Thereafter, the second network device 116 may determine if the destination address of the organization data packet is within an organization associated with the second network device 116 or within the second AS 104. Based on the determination, the second network device 116 may either further route the organization data packet, for example, to another edge network device associated with another organization or AS, or to a node corresponding to the destination address within the second AS 104, or to another network device within the second AS 104 that may be positioned between the node and the second network device 116.

Figure 9:
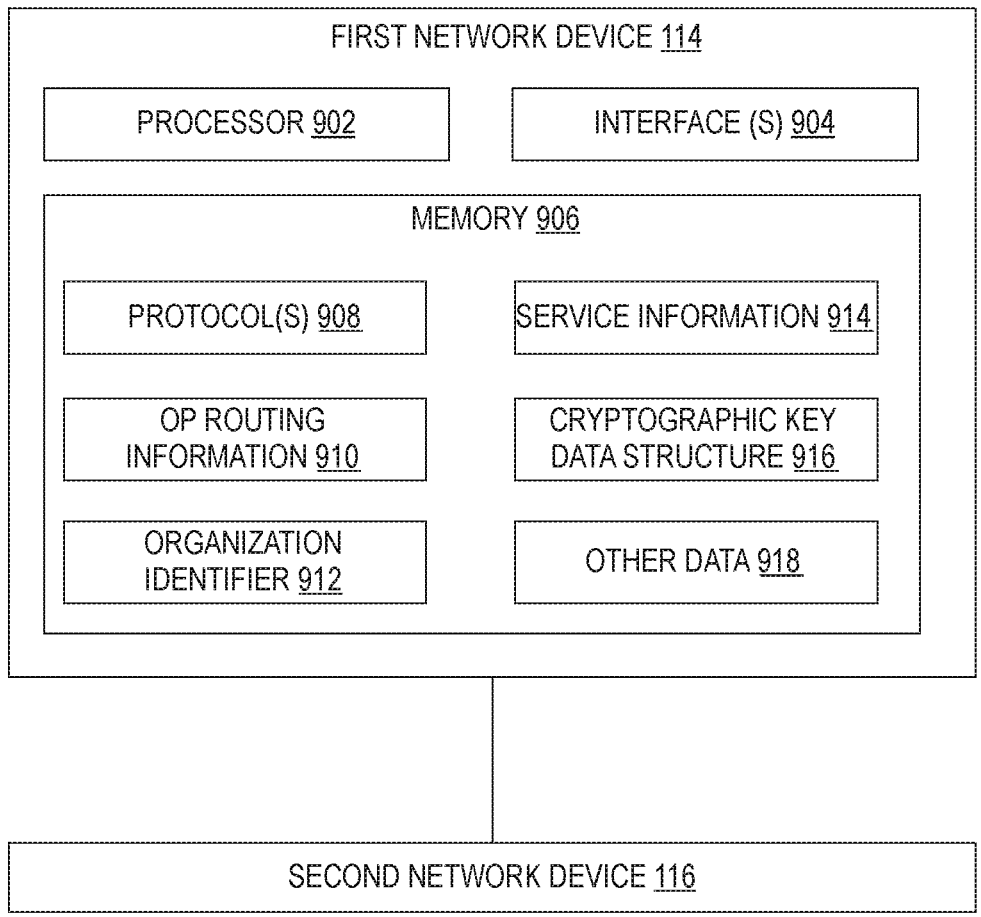
FIG. 9 illustrates a block diagram representation of a network device capable of implementing various embodiments of the present disclosure.

FIG. 9 illustrates a block diagram representation 900 of a first network device 114 connected to a second network device 116 capable of implementing various embodiments of the present disclosure. In the present example, the first network device 114 includes processor 902, interface 904, and memory 906. The processor 902, the interface 904, and the memory 906 may be connected to each other by using a bus. In this embodiment of the present disclosure, the processor 902 is configured to control and manage an action of the first network device 114. For example, the processor 902 is configured to perform steps 302-310 in FIG. 3, steps 802-822 in FIG. 8, and/or another process of the technology described in this specification. The interface 904 is configured to support communication of the first network device 114. The memory 906 is configured to store program code and data of the first network device 114.

The processor 902 may be a central processing unit, a general-purpose processor, a digital signal processor, an application-specific integrated circuit, a field-programmable gate array, or another programmable logic device, a transistor logic device, a hardware component, or any combination thereof. The processor 902 may implement or execute various example logical blocks, modules, and circuits described with reference to content disclosed in this application. Alternatively, the processor 902 may be a combination for implementing a computing function, for example, a combination of one or more microprocessors, or a combination of a digital signal processor and a microprocessor.

The memory 906 may be computer-operated hardware suitable for storing and/or retrieving data, such as but not limited to, protocol(s) 908, OP routing information 910, organization identifier 912, service information 914, cryptographic key data structure 916, and other data 918. The memory 906 may include multiple storage units such as hard disks and/or solid-state disks in a redundant array of inexpensive disks (RAID) configuration. The memory 906 may include a storage area network (SAN) and/or a network-attached storage (NAS) system. In some alternate embodiments, the memory 906 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc.

In some embodiments, the memory 906 is integrated within the first network device 114. For example, the first network device 114 may include one or more hard disk drives as the memory 906. In other embodiments, the memory 906 is external to the first network device 114 and may be accessed by the first network device 114 using a bus. The bus may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like.

In operation, the processor 902 of the first network device 114 may access organization packet (OP) routing information 910, a cryptographic key data structure 916, and service information 914 relating to an organization associated with a first autonomous system 102 within which the first network device 114 operates. The processor 902 may access the OP routing information 910 and the service information 914 based at least on the organization identifier 912 of the organization. Further, the service information 914 may indicate a service type associated with the organization. For example, the processor 902 may retrieve organization identifier 912 from a computing node associated with the organization, or an ISP associated with the first network device 114 with which the organization may have registered. Further, the service information 914 may indicate a service type selected by the organization for routing data packets from the organization to the corresponding destination address The processor 902 further sends a connection request to the second network device 116. The second network device 116 may be associated with a second autonomous system 104 and a different organization. In an example, the first network device 114 and the second network device 116 may be OTGP edge routers and may be administered by the same or different ISP. The processor 902 may send the connection request to establish a linked network path between the first network device 114 and the second network device 116. The connection request may include cryptographic key data structure 916 and the service information 914. In particular, the cryptographic key data structure 916 may be shared to build the linked network path, and the service information 914 may be shared to build the linked network path based on the service type indicated in the service information 914.

For example, the processor 902 may establish a neighbor relationship link with the second network device 116 before sending the communication request. In this regard, the processor 902 may send a plurality of service messages to the second network device 116 to establish a neighbor relationship link. In an example, the plurality of service messages may be shared to form the neighbor relationship link based on a service type selected by the organization. Upon receiving positive acknowledgment corresponding to the plurality of service messages, the processor 902 may send the connection request to the second network device 116.

Based on the cryptographic key data structure 916, the second network device 116 may complete the linked network path. Further, the second network device 116 may send an acknowledgment back to the first network device 114. The acknowledgment may include a security key for the encryption of data packets from the organization.

Responsive to receiving the acknowledgment, the processor 902 may encrypt an organization data packet using the cryptographic key data structure and the organization identifier 912. For example, the organization associated with the first autonomous system 102 and the first network device 114 may include a first set of nodes. Subsequently, the processor 902 may receive the organization data packet from a node from the first set of nodes. The organization data packet may have an associated OP header that may indicate the service type selected by the organization. Further, the processor 902 may encrypt the organization data packet using the security key received from the second network device 116 in response to establishing the linked network path and the organization identifier 912. In certain cases, the processor 902 may further encrypt the organization data packet using a device identifier associated with the node that sends the organization data packet to the processor 902. In an example, the device identifier may be MAC address of the node. The processor 902 may further send the encrypted organization data packet to the second network device 116, via the linked network path.

The disclosed methods, operations, and/or the flow diagrams 300, 400, 500, 600, 700, and 800 as disclosed herein may be implemented using software including computer-executable stored on one or more computer-readable storage medium (e.g., non-transitory computer-readable medium, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber-optic cable), magnetic communications, electromagnetic communications (including RF, microwave, and infrared communications), mobile communications, or other such communication means.

Further, the methods and/or operations may be practiced by a computer system including one or more processors and computer-readable media such as computer memory. In particular, the computer memory may store computer-executable instructions that when executed by one or more processors cause various functions to be performed, such as the acts recited in the above embodiments.

Embodiments of the present disclosure may include or utilize a special purpose or general-purpose computer including computer hardware, as discussed in greater detail below. Embodiments within the scope of the present disclosure also include physical and other computer-readable media for carrying or storing computer-executable instructions and/or data structures. Such computer-readable media may be any available media that may be accessed by a general-purpose or special purpose computer system. Computer-readable media that store computer-executable instructions are physical storage media. Computer-readable media that carry computer-executable instructions are transmission media. Thus, by way of example, and not limitation, embodiments of the present disclosure can include at least two distinctly different kinds of computer-readable media: physical computer-readable storage media and transmission computer-readable media.

Physical computer-readable storage media includes RAM, ROM, EEPROM, CDROM or other optical disk storage (such as CDs, DVDs, etc.), magnetic disk storage or other magnetic storage devices, or any other medium which can be used to store desired program code means in the form of computer-executable instructions or data structures and which can be accessed by a general-purpose or special purpose computer.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   accessing, by a first network device of a first autonomous system, organization packet (OP) routing information, a cryptographic key data structure and service information relating to an organization associated with the first autonomous system, the OP routing information and the service information being accessed based, at least in part, on an organization identifier of the organization, the service information indicating a service type associated with the organization;
   sending, by the first network device, a connection request to a second network device associated with a second autonomous system to establish a linked network path between the first network device and the second network device, the connection request comprising the cryptographic key data structure and the service information, wherein the first network device and the second network device are configured with organization transit gateway protocol (OTGP);
   receiving, by the first network device, an acknowledgment pertaining to the linked network path from the second network device, wherein the second network device completes the linked network path based on the cryptographic key data structure;
   responsive to receiving the acknowledgment, encrypting, by the first network device, an organization data packet based, at least in part, on the cryptographic key data structure and the organization identifier;
   sending, by the first network device, the encrypted organization data packet to the second network device, via the linked network path;
   receiving, by the first network device, the organization data packet from a node of a first set of nodes associated with the organization;
   encrypting, by the first network device, the organization data packet using a device identifier associated with the node;
   sending, by the first network device, the encrypted organization data packet to the second network device via the linked network path;
   wherein the first autonomous system comprises a plurality of network devices including the first network device, at least one service network device and at least one forwarding network device, and
   wherein the method further comprises:
   receiving, by a first forwarding network device, the organization data packet from the node, the first forwarding network device positioned between the first network device and the node; and
   forwarding, by the first forwarding network device, the organization data packet to the first network device for routing.

2. The computer-implemented method of claim 1, wherein the first network device and the second network device are edge OTGP network devices.

3. The computer-implemented method of claim 1, further comprising:
   sending, by the first network device, a plurality of service messages to the second network device to establish a neighbor relationship link; and KAIM-PO02 53
   upon receiving positive acknowledgment corresponding to the plurality of service messages, sending, by the first network device, the connection request to the second network device.

4. The computer-implemented method of claim 1, wherein the organization associated with the first autonomous system further comprises a third network device, the first network device and the third network device being configured with the service type associated with the organization and the first network device and the third network device having linked interface therebetween, wherein the method further comprises:
   sending, by the first network device, route advertisement for the first autonomous system comprising the OP routing information to the third network device, via the linked interface, wherein the third network device is configured to not use the linked interface between the first network device and the third network device for reverse-forwarding the route advertisement.

5. The computer-implemented method of claim 4, wherein the route advertisement comprises the OP routing information and the OP routing information having an associated revision identifier indicative of a version of the OP routing information, wherein the method further comprises:
   receiving, by the first network device, an OP route update information from a fourth network device within the organization, the OP route update information comprising updated OP routing information and updated revision identifier, the fourth network device being configured with the service type associated with the organization and having a linked interface with the third network device and unlinked interface with the first network device;
   updating, by the first network device, the OP routing information and incrementing the revision identifier; and
   sending, by the first network device, an updated route advertisement for the first autonomous system comprising the updated OP routing information associated with the organization to the third network device.

6. A device comprising:
a memory;
an interface; and
a processor communicably coupled to the memory and the interface, wherein the memory stores instructions that configure the processor to perform at least in part to:
access organization packet (OP) routing information, a cryptographic key data structure and service information relating to an organization associated with a first autonomous system, the OP routing information and the service information being accessed based at least on an organization identifier of the organization, the service information indicating a service type associated with the organization and the first autonomous system associated with the device;
send a connection request to a network device associated with a second autonomous system to establish a linked network path between the device and the network device, the connection request comprising the cryptographic key data structure and the service information, wherein the device and the network device are configured with organization transit gateway protocol (OTGP);
receive an acknowledgment pertaining to the linked network path from the network device, wherein the network device completes the linked network path based on the cryptographic key data structure;
responsive to receiving the acknowledgment, encrypting, by the first network device, an organization data packet based, at least in part, on the cryptographic key data structure and the organization identifier; and
send the encrypted organization data packet to the network device, via the linked network path.

7. The device of claim 6, wherein the first autonomous system comprises a plurality of network devices and a first set of nodes associated with the organization, the plurality of network devices comprising the device, at least one service network device, and at least one forwarding network device, and wherein the device is an edge OTGP network device.

8. The device of claim 6, wherein processor is further caused at least in part to:
send a plurality of service messages to the network device to establish a neighbor relationship link; and
upon receiving positive acknowledgment corresponding to the plurality of service messages, send the connection request to the network device.

9. The device of claim 6, wherein the processor is further caused at least in part to:
receive the organization data packet from a node of a first set of nodes associated with the organization;
encrypt the organization data packet using a device identifier associated with the node; and
send the encrypted organization data packet to the network device via the linked network path.

10. The device of claim 6, wherein the OP routing information has an associated revision identifier, and wherein the revision identifier of the OP routing information is updated with an update of the OP routing information.

11. A non-transitory machine-readable storage medium that provides instructions that, if executed by a processor of a first network device acting as an organization transit gateway protocol (OTGP) router associated with a first autonomous system, cause the processor to perform operations comprising:
access organization packet (OP) routing information, a cryptographic key data structure and service information relating to an organization associated with a first autonomous system, the OP routing information and the service information being accessed based at least on an organization identifier of the organization, the service information indicating a service type associated with the organization;
send a connection request to a second network device associated with a second autonomous system to establish a linked network path between the first network device and the second network device, the connection request comprising the cryptographic key data structure and the service information, wherein the first network device and the second network device are configured with organization transit gateway protocol (OTGP);
receive an acknowledgment pertaining to the linked network path from the second network device, wherein the second network device completes the linked network path based on the cryptographic key data structure;
responsive to receiving the acknowledgment, encrypting, by the first network device, an organization data packet based, at least in part, on the cryptographic key data structure and the organization identifier; and
send the encrypted organization data packet to the second network device, via the linked network path.

12. The non-transitory machine-readable storage medium of claim 11, wherein the instructions, that when executed, further cause the processor to:
send a plurality of service messages to the second network device to establish a neighbor relationship link; and
upon receiving positive acknowledgment corresponding to the plurality of service messages, sending the connection request to the second network device.

13. The non-transitory machine-readable storage medium of claim 11, wherein the instructions, that when executed, further cause the processor to:
receive the organization data packet from a node of a first set of nodes associated with the organization;
encrypt the organization data packet using a device identifier associated with the node; and
send the encrypted organization data packet to the second network device via the linked network path.

* * * * *